(12) United States Patent (10) Patent No.: US 9,219,375 B2
Woods (45) Date of Patent: Dec. 22, 2015

(54) BATTERY CAPABLE OF WITHSTANDING THE EFFECTS OF LIQUID SUBMERSION

(71) Applicant: Stryker Corporation, Kalamazoo, MI (US)

(72) Inventor: Philip Woods, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 19 days.

(21) Appl. No.: 14/278,506

(22) Filed: May 15, 2014

(65) Prior Publication Data

US 2014/0266057 A1 Sep. 18, 2014

Related U.S. Application Data

(63) Continuation of application No. PCT/US2012/064764, filed on Nov. 13, 2012.

(60) Provisional application No. 61/561,126, filed on Nov. 17, 2011.

(51) Int. Cl.
*H02J 7/00* (2006.01)
*H01M 10/42* (2006.01)

(52) U.S. Cl.
CPC .......... *H02J 7/007* (2013.01); *H01M 10/4221* (2013.01); *H01M 10/4257* (2013.01); *H02J 7/0003* (2013.01); *H02J 7/0068* (2013.01); *H01M 2010/4278* (2013.01); *H02J 2007/0001* (2013.01)

(58) Field of Classification Search
CPC ..................................................... G06F 1/1632

USPC ............................................ 320/106, 128, 137
See application file for complete search history.

(56) References Cited

U.S. PATENT DOCUMENTS

| 6,018,227 | A | 1/2000 | Kumar et al. |
| 7,705,559 | B2 | 4/2010 | Powell et al. |
| 2003/0102842 | A1 | 6/2003 | Tamai et al. |
| 2005/0057216 | A1 | 3/2005 | Yamaguchi et al. |
| 2006/0076924 | A1* | 4/2006 | Kim et al. ...................... 320/112 |
| 2007/0090788 | A1 | 4/2007 | Hansford et al. |
| 2011/0095722 | A1* | 4/2011 | Chang ........................... 320/107 |

FOREIGN PATENT DOCUMENTS

EP 2 510 891 A1 10/2012

OTHER PUBLICATIONS

PCT "International Search Report and Written Opinion" for PCT/US2012/064764, dated Nov. 5, 2013.

* cited by examiner

*Primary Examiner* — Richard V Muralidar

(57) ABSTRACT

A battery (30) includes a circuit (164, 234, 260) the selectively ties the cells (32) to the contacts (78, 80). If signals present at the contacts indicate the battery may be short circuited, the voltage is only cyclically presented across the contacts. Until the battery receives a defined recognition code, only a current limited voltage is presented across the contacts.

30 Claims, 14 Drawing Sheets

BATTERY CAPABLE OF WITHSTANDING THE EFFECTS OF LIQUID SUBMERSION

RELATIONSHIP TO EARLIER FILED APPLICATIONS

This application is a continuation of PCT App. No. PCT/US2012/064764 filed 13 Nov. 2012. PCT App. No. PCT/US2012/064764 claims the benefit of U.S. Provisional Pat. App. No. 61/561,126 filed 17 Nov. 2014. The contents of the priority applications are incorporated herein by reference.

FIELD OF THE INVENTION

This invention relates generally to a battery. More particularly, it relates to a battery able to withstand the effects of being submerged in liquid.

BACKGROUND OF THE INVENTION

A rechargeable battery, as its name implies, is capable of repeatedly being charged, storing the charge and delivering the charge to the tool or other device to which the battery is attached. Rechargeable batteries have, over the years, evolved into reliable power sources for powered surgical tools used in operating rooms to perform surgical procedures. The use of a battery eliminates the need to provide a power cord connected to an external power source. The elimination of the power cord offers benefits over corded surgical tools. Surgical personnel using this type of tool do not have to concern themselves with either sterilizing a cord so that it can be brought into the sterile surgical field surrounding the patient or ensuring that, during surgery, an unsterilized cord is not inadvertently introduced into the surgical field. Moreover, the elimination of the cord results in the like elimination of the physical clutter and field-of-view blockage the cord otherwise brings to a surgical procedure.

A rechargeable battery typically includes a housing. One or more rechargeable cells are disposed in the housing. The cells are formed from material capable of storing electrical charge. Presently cells are made from nickel or lithium based materials. Typically, plural cells are disposed in the housing. The cells are connected together in series and/or parallel. Mounted to the housing are at least two contacts. One contact, the cathode, is the contact through which current flows out of the battery. The second contact is the anode, essentially the ground terminal for the battery. The cathode and anode are the terminals to which a charge is applied to the cells. The cathode and anode terminals are also the terminals connected to the complementary terminals of the tool the battery is employed to energize. The current flows out of the cathode terminal to the complementary component in the terminal that requires a current to operate.

Some batteries are also provided with supplemental components. These components include internal sensors, data collection circuits, memories or control processors. These components: monitor the environment to which the battery is exposed; store data regarding the use of the battery; or store data regarding the tool to which the battery is attached. The Applicant's Assignee's U.S. Pat. No. 6,018,227, BATTERY CHARGER ESPECIALLY USEFUL WITH STERILIZABLE RECHARGEABLE BATTERY PACKS, issued 25 Jan. 2000 and is US Patent Pub. No. 2007/0090788/PCT Pub. No. WO 2007/050439 A2, SYSTEM AND METHOD FOR RECHARGING A BATTERY EXPOSED TO A HARSH ENVIRONMENT, published 26 Apr. 2007, the contents of both which are explicitly incorporated herein by reference, disclose batteries that include these supplemental components. When a battery is provided with one of these supplemental components, the battery housing includes a supplemental contact. This supplemental contact is the contact through which signals are received from and/or transmitted to the supplemental components.

Batteries used to power surgical tools are exposed to adverse environmental elements to which batteries used for non-medical uses are seldom exposed. For example, during a surgical procedure, a medical battery may be exposed to blood or other body fluid. Tissue removed from the patient may adhere to the battery. While not an intended part of any procedure, a battery may be exposed to a saline solution. To eliminate the risk of patient's being infected during the course of the medical procedure, it is therefore standard practice to, between surgical procedures, sterilize the battery. This cleaning/sterilization process typically involves rinsing the battery to remove contaminates that are readily visible on the surface of the battery.

During any one of the above events, a liquid bridge can form between the cathode and anode contacts. These liquids, even if just tap water, can form a conductive bridge between the cathode and the anode. If the bridge is conductive, there is current flow between the contacts. The conductive liquid undergoes an electrolytic reaction with the metal forming the anode contact. As a consequence of this reaction, a layer of metal oxide forms on the anode terminal. This oxide layer functions as an impedance layer. The presence of this impedance layer reduces the efficiency of the both the charging of the battery and of the battery to deliver charge to the tool to which the battery is attached.

If the battery is provided with supplemental components, the exposure of its terminals to liquid may also cause oxidation of the data terminal. The resultant oxide layer, if of sufficient size, may essentially function as a resistor in series with the data terminal. The presence of this oxide layer can attenuate the levels of the signals applied to or read out from the battery over the data terminal. This voltage attenuation may be such that they cannot be processed by the components to which they are applied.

Further, it is now a common practice to design a battery so it is a part of specific cordless tool system. The battery and the tools the battery is intended to charge are designed to cooperate in a specific manner. For example, in the event a processor internal to the battery determines that the battery is in a specific state, the battery may communicate this information to the attached tool. A processor internal to the tool, in response to this information, then regulates the operation of the tool based on the battery state information. For example, if a battery processor determines that the associated cells may be in a low charge state, the processor may communicate this information to a processor in the attached tool. In response to this information, the tool processor may attenuate the operation of the tool power generating unit to prevent the sudden complete discharge of the battery.

A manufacturer of this type of tool system may be reluctant to allow a battery to be used with tools that the manufacturer is not sure will work appropriately when attached to the battery. To avoid this unintended use of the battery, it is a practice to design the battery so that the battery processor controls whether or not the cells source current to the attached tool. It has been suggested to design a battery so that when a tool is first attached to the battery, the battery processor allows current flow to the attached device for a relatively short amount of time. This would allow the processor internal to the tool to power up and then exchange recognition codes with the battery processor. If the battery processor does not receive the appropriate recognition codes within a defined time frame, the battery processor, blocks the sourcing of electrical current to the tool.

The above system would prevent a battery from serving as an extended power source for a tool or other device for which the battery is not specifically designed. However, during the period in which the processors internal to the battery and tool are exchanging signals, current can be sourced to the power generating unit internal to the tool. When initially attached to battery, a tool not intended for use with the battery could function. Only after the battery processor determines that it has not received the appropriate recognition codes, does the battery processor terminate the sourcing of current tool. Thus, for at least a few seconds, the tool will run and then shut off. This could provide the individual using the tool the mistaken impression that, since the tool started and stopped, there is a malfunction with either the tool or the battery.

Moreover, an individual, for either mischievous or malicious reasons, with knowledge of the features of this type of battery, could tamper with the battery so as to cause drainage of an appreciable fraction of the cell's stored charge.

SUMMARY OF THE INVENTION

This invention is directed to a new and useful battery. This battery of this invention is designed so that, when exposed to liquids, the corrosion of the anode terminal is substantially reduced. The battery of this invention is further designed so that, when a tool or other charge drawing device is attached to the battery, initially there is only a minimal drain of the battery's stored charge. Only after the battery has determined that the tool or device is intended for use with the battery is a large charge supplied.

The battery of this invention includes at least one cell and a control circuit. The control circuit selectively ties the cells to the contacts through which the cells are charged and the cells source charge. In some, but not all versions of the invention, the battery includes a supplemental contact, a data contact. Data are written out of and to the processor through the data contact. These signals are written out to or received from the chargers and tools to which the battery is connected.

The control circuit of this invention selectively connects the cells to the cathode or data contact as a function of the signals present at the data contact. Based on these signals, the processor determines if the signals present are as a result of the battery being connected to a tool or charger or, present as a result of liquid bridge potentially being present across the terminals. If the processor determines that the signals present as a result of the battery being connected to a tool or charger, the connection between the cells and the cathode contact is maintained. However, if the processor determines that the battery is potentially in an environment in which there is a liquid bridge between the cathode and anode terminals, the processor disconnects the cells from the cathode contact and, if present, the data contact.

The battery of this invention substantially eliminates current flow to the anode contact when there is possibility that such current flow could be due to the presence of a liquid bridge between the cathode and anode terminals. The inhibiting of the current flow when the battery is in this state substantially eliminates the resultant corrosion of the anode contact.

The battery of this invention also has a selectively actuated current limited voltage source. When the battery processor initially determines that tool may be attached to the battery, the control circuit enables the current limited voltage source so as to tie the battery's cells to this voltage source. When the battery is in this state, the battery sources a sufficient current to the attached tool to power the processor internal to the tool. The current is not sufficient to power any larger power consuming device internal to the tool. The tool processor is therefore able to exchange recognition codes with the battery. Once the battery control circuit determines that the attached tool is intended for use with the battery, the battery processor connects the tool directly to the cells and disables the current limited voltage source.

The above feature of the battery of the invention allows the battery to source the current sufficient for the attached tool to communicate with the battery but not enough to actuate the power output device internal to the tool. Consequently, when a tool or other device not intended for use with the battery is attached to the battery, the tool/device does not function. Further, when the battery is in this state, the power draw on the battery's cells is relatively low.

In many versions of this invention the control circuit includes switches, typically FETs that selectively tie the cells to the contacts and that activate/deactivate the current limiter. The control circuit may include a processor that regulates the on/off states of the switches.

In many but not all versions of versions of the invention the battery includes plural cells. These cells may be connected together in series and/or parallel. In some versions of the invention, the cells are rechargeable. In these versions of the invention the battery is considered a rechargeable battery.

BRIEF DESCRIPTION OF THE DRAWINGS

The above and further features and advantages of this invention are understood from the following Detailed Description taken in conjunction with the following drawings in which.

DETAILED DESCRIPTION

I. Overview

Figure 1:
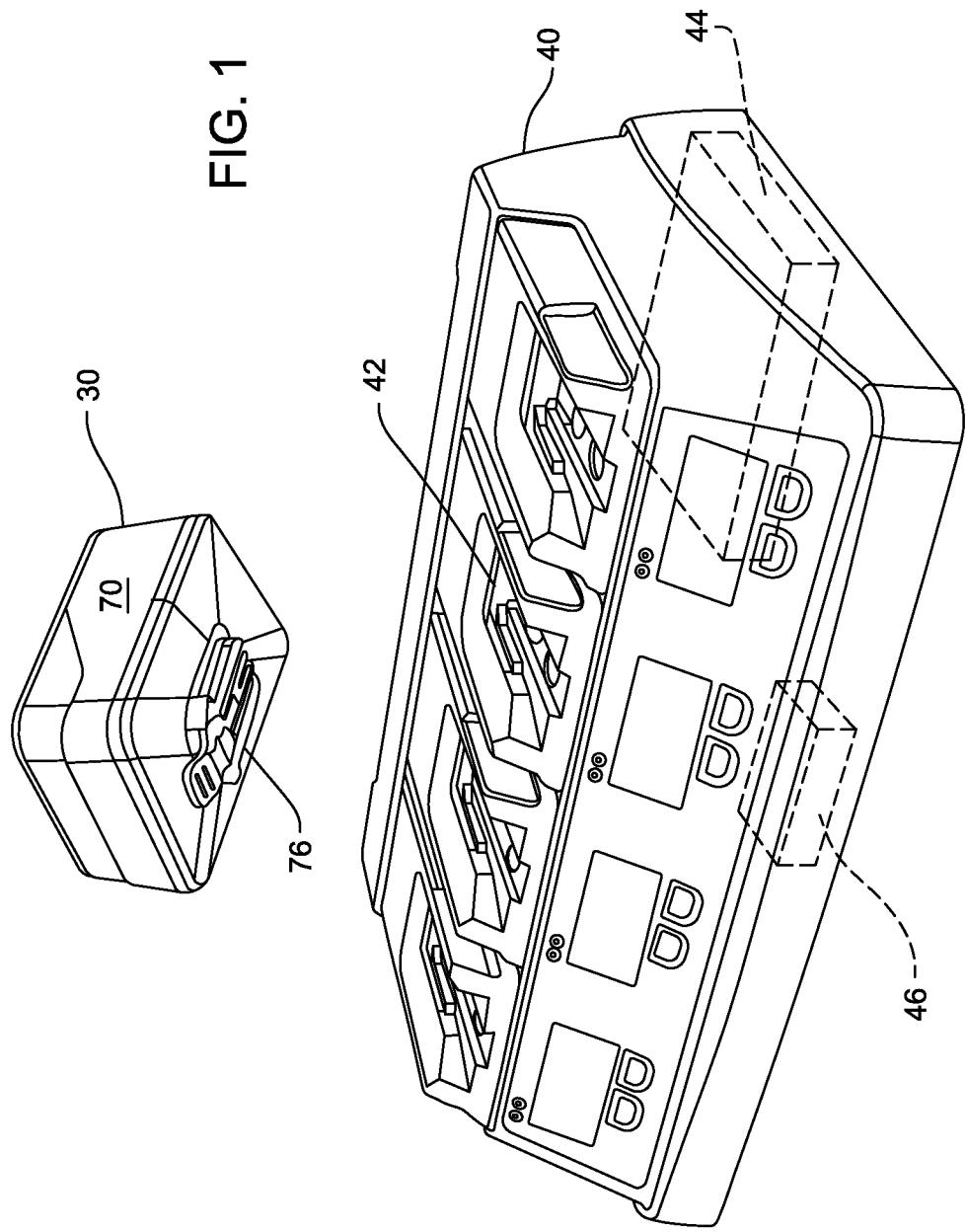
FIG. 1 is a perspective view of a battery of this invention and how the battery is fitted to a charger.

FIG. 1 illustrates a battery 30 of this invention and how the battery is attached to a charger 40. Internal to the battery are one or more rechargeable cells 32 (FIG. 3) capable of storing electrical charge. Charger 40 has at least one socket 42 shaped to releasably hold the battery. Internal to the charger 40 is a power source, illustrated by phantom rectangular block 44. Also internal to the charger is a processor, illustrated by phantom rectangular block 46. When battery 30 is attached to the charger, the power source 42 applies a charging current to the battery cells 32. Charger processor 46 regulates the charging of the battery by power source 44. The charger processor 46 also is capable of retrieving data from and writing data to memories internal to the battery 30.

Figure 2:
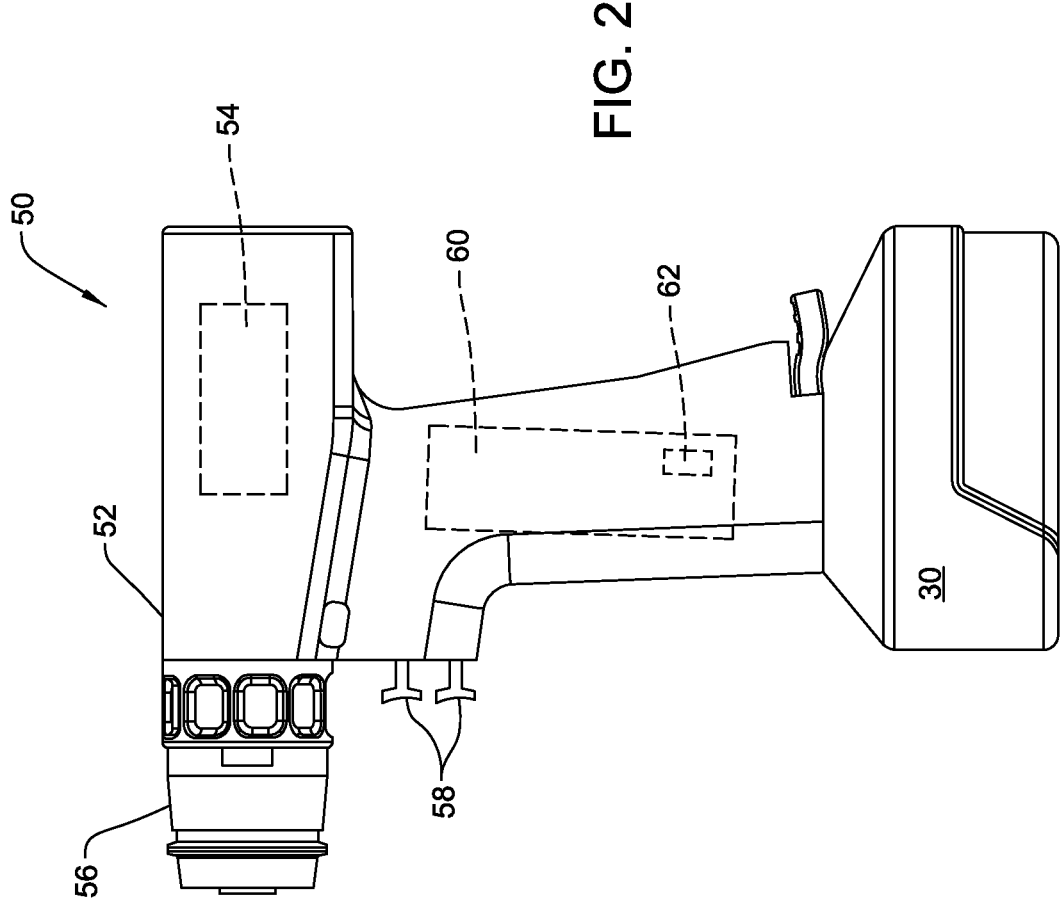
FIG. 2 is a plan view of a battery of this invention attached to a power consuming device, here a powered surgical tool.

In FIG. 2, the battery 30 is shown attached to a power consuming device, here a powered surgical tool 50. In the depicted version of the invention, tool 50 has a housing 52 that, in the depicted version of the invention, is pistol shaped. The butt end of the tool housing 52 is shaped to releasably receive the battery 30. A powered surgical tool has a power generating component that, converts the electrical energy drawn from the battery cells 32 into another form of energy useful for performing a medical or surgical procedure. In the depicted version of the invention, the power generating component is a motor, represented by dashed rectangle 54. Many power surgical tools have a coupling assembly, represented by ring 56. The coupling assembly 56 releasably attaches an energy applicator to the power generating component, motor 54. The energy applicator is the device that actually applies the energy output by the power generating unit to the site where the medical/surgical procedure is being performed. If the power generating unit is a motor 54, the energy applicator may be what is referred to as a cutting accessory. The structure of the tool 50, the tool power generating component and energy applicator is not relevant to the present invention and therefore is not illustrated. For simplicity, the tool power generating component is below referred to as motor 54 even though other tools may have other power generating devices that draw current to function.

Tool 50 also has at least one manually actuatable control member. The depicted tool 50 has two triggers 58. The triggers 58 are depressed by the practitioner to regulate the actuation of the tool. Also internal to the tool is a control module 60, (depicted as a phantom rectangle.) The control module 60 includes components that monitor the actuation of the triggers 58. Other components internal to the control module, in response to the actuation of the triggers 56 selectively connect the battery cells 32 to the tool motor 52. One of these other components internal to control module 58 is a tool processor 62.

II. Assembly

Figure 3:
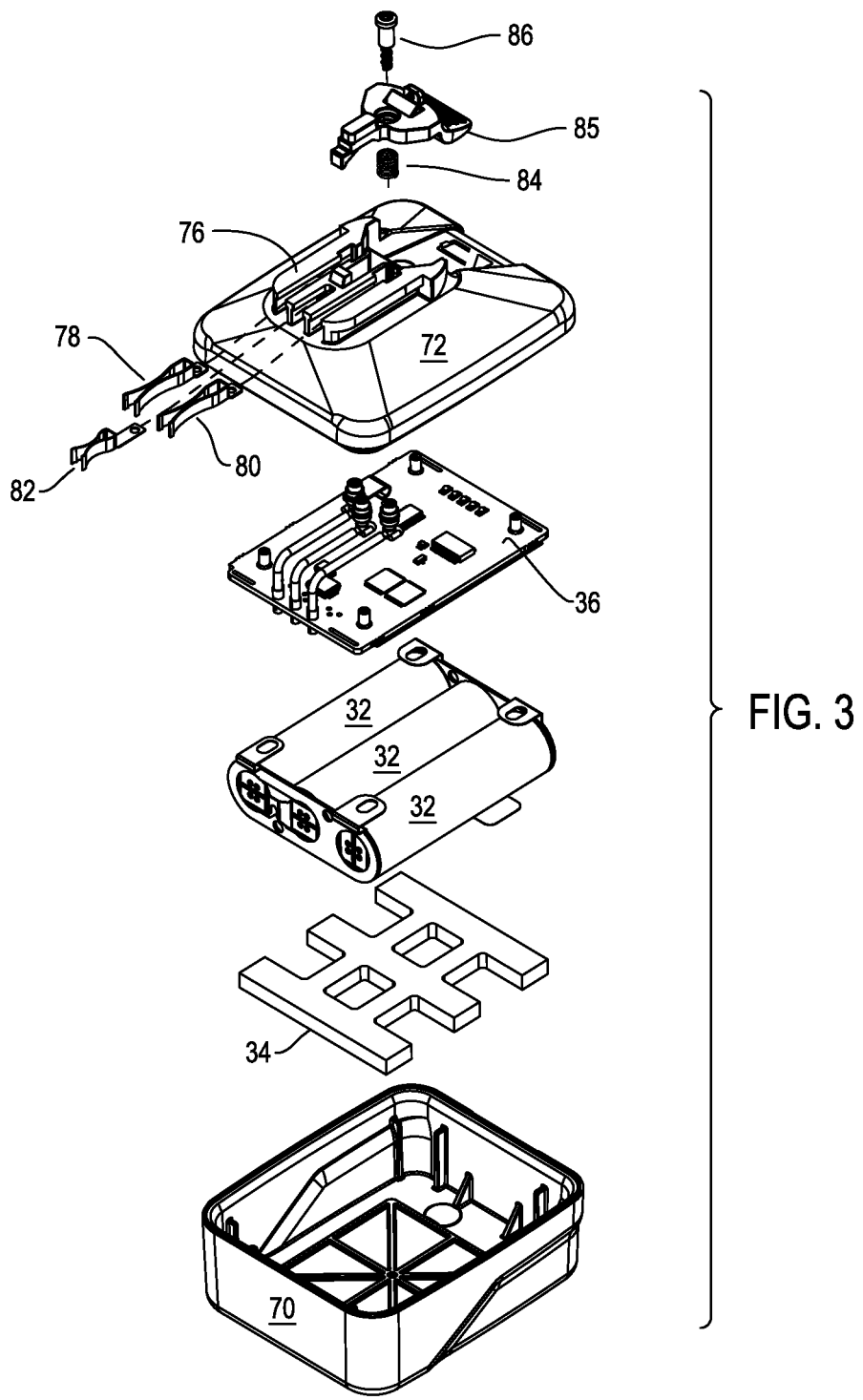
FIG. 3 is an exploded view of the battery.

As seen in FIG. 3, a battery 30 of this invention includes a shell 70. Rechargeable cells 32 are seated in shell 70. In the depicted version of the invention the cells are connected together in series to form a cell cluster (not identified). The cell cluster is seated on a foam pad 34 disposed in the base of shell 70. A lid 72 is sealing disposed over the open top end of the shell 70. If the battery 30 is intended for medical/surgical use, the lid 72 may be attached to the shell 70 so the shell and lid collectively form a sterilizable housing. Lid 72 is formed with a head, battery head 76. Battery head 76 is dimensioned to fit both in the charger socket 42 and against the butt end of the tool housing 52. The battery head 76 is provided with power contacts 78 and 80 and a data contact 82. Power contacts 78 and 80 are the conductive members through which the charger 40 applies a charging current to the cells 32 and from which the surgical tool 50 draws an energizing current. One contact, contact 78 is the cathode. Power contact 80 is the anode of the battery 30. Data contact 82 is the contact through over which data and instruction signals are written into and read out from the battery 30. The data contact 82 is thus the contact over which battery 30 exchanges data and instructions with charger processor 44 and tool processor 62. These signals are exchanged using a one-wire signal exchange protocol. One such protocol is the Dallas Semiconductor One-Wire protocol.

A latch 85 is pivotally mounted to the battery lid 72. The latch 85 holds the battery 30 to the butt end of tool housing 52. A pin 86 holds latch to the lid 72. A spring 84 biases one portion of the latch away from the adjacent surface of the lid 72.

Mounted to the cell cluster so as to be between the cells 32 and lid 72 is a circuit board 36. Circuit board 36 holds the below described components that selectively connect cells 32 to at least the anode contact 80. Not identified are the mechanical components that provide electrically conductive connections between the circuit board 36 and terminals 78, 80 and 82. Not illustrated are the mechanical components that attach the circuit board 36 to the cell cluster.

In many versions of the invention cells 32 are lithium ion cells. One such cell is the APR18650M1A cell manufactured by A123 Systems of Waltham, Mass. Each cell, when properly charged, has a nominal cell voltage of 3.3 VDC. In many, but not all versions of the invention, the cells are connected together in series. In the described version of the invention battery 30 includes 3 series connected cells 32. This version of battery 30 is therefore configured to output a charge at a potential of around 9.9 VDC.

Figure 4:
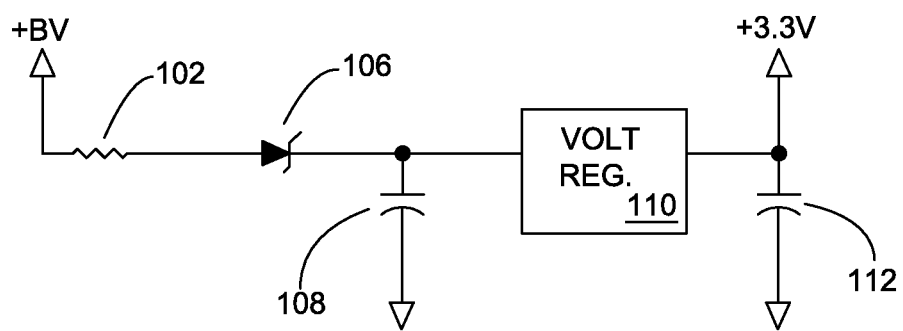
FIG. 4 is a schematic diagram of the constant voltage power source internal to the battery.

FIG. 4 depicts the components on circuit board 36 that provide a constant voltage signal to the other components that connect the cells to contacts 76, 80 and 82. As seen in this Figure a BV signal, the voltage across the cells 32 and a switch MOSFET 152 (FIG. 5D), is applied to a resistor 102. The anode of a Schottky diode 106 is tied to resistor 102. The cathode of diode 106 is tied to the input pin of a voltage regulator 110. One voltage regulator is able to accept input voltages of up to 24 Volts. The voltage regulator 110 converts the input voltage into the constant voltage signal used by other power consuming components internal to the battery that regulate the connection of the cells 32 to contacts 78 and 80. One voltage regulator 110 that can be incorporated into this invention is the TPS715A voltage regulator available from Texas Instruments of Dallas, Tex.

At least one capacitor 108 is connected between the cathode of diode 106 and the input pin into voltage regulator 110. Diode 106 and capacitor 108 collectively function as a cell for storing charge that can be applied to the voltage regulator 110. This is because there are times during the operation of certain surgical tools that, owing to the momentary high current draw by the power tool, the potential of the BV signal drops below the level needed by the voltage regulator 110 to produce the constant voltage signal the regulator is intended to output. During these momentary voltage drops, the charge stored in capacitor 108 is applied to the input pin of the voltage regulator 110. This charge boosts the potential of the signal applied to the voltage regulator 110 to above the minimum level the regulator needs to function as a constant level voltage source.

A capacitor 112 is tied between the output pin of the voltage regulator 110 and ground. The signal present at the junction of the voltage regulator 110 and capacitor 112 is the signals applied to the other power consuming components internal to battery 30 that regulate the operator of the battery. To reduce the complexity of the subsequent drawings not all connections to the output pin of voltage regulator 110 are depicted.

The main circuit that regulates the operation of battery 30 is now described by reference to FIGS. 5A through 5D. These Figures depict the control circuit that selectively ties the cells 32 to contacts 78, 80 and 82. In brief, there are two primary switching MOSFETs 152 and 164, a cell regulator, (CELL REG.) 180 and a processor 260. MOSFETs 152 and 164 selectively connect the cells 32 to cathode contact 78. The on/off states of MOSFETs 152 and 164 are controlled by signals asserted by the cell regulator 180. The cell regulator 180 controls the states of MOSFETs 152 and 164 based on instructions from the main processor 260. Processor 260 exchanges information with the devices to which the battery 30 is attached. Based on the type of the device to which the battery is attached, processor 260 outputs instructions to the cell regulator 180 to cause the cell regulator to selectively turn on and turn off MOSFETs 152 and 164. Also internal to battery 30 is a current limited voltage source. When processor 260 determines that the battery 30 is initially attached to another device, the processor 260 activates the current limited voltage source. If the processor 260 determines that device is one the battery is authorized to power, processor 260 first ties the cells 32 directly to the device. Processor 260 then deactivates the current limited voltage source.

Processor 260 can be a 8-bit microprocessor, the PIC18F26K20 available from Microchip Technology of Chandler, Ariz. This particular integrated circuit has a memory (not illustrated) capable of handling 64 Kbytes of data. This allows the processor 260 to store both the operating instructions for processor and historical data regarding the use of the battery 30. The memory internal to the processor 260 is also of sufficient size that the memory is able to store data written to the memory by tool processor 62. When the battery is the attached to the charger 40, the charger processor 46 reads these data from the tool out of the battery and forwards these data to a remote device. The memory internal to battery processor 260 also stores data, such as revised operating instructions, that a remote device provides for uploading to the tool 50.

Processor 260 is powered by the 3.3 VDC signal from voltage regulator 110. Not shown are the capacitors tied between the processor power in pin and ground that filter this power signal. Attached to processor 260 is crystal 118. Crystal 118 provides a constant frequency clock signal to processor 260. In one version of the invention, crystal 118 operates at a frequency of 12 Mhz. Not illustrated are the capacitors tied between the opposed ends of crystal 118 and ground.

A thermistor 120 is connected to processor 260 for providing a variable signal representative of the ambient temperature of the battery 30. One end of thermistors 120 is connected to processor 260. The opposed end of thermistor 120 receives the 3.3 VDC signal from voltage regulator 110. A resistor 122 is connected between the input pin to which thermistor 120 is connected and a ground internal to processor 260. In some versions of the invention, resistor 122 is normally tied to a 3.3 VDC source. Only when processor 260 is at point in a cycle in which there is a need to monitor temperature is resistor 122 tied to ground. This minimizes the dissipation of power by thermistor 120 and resistor 122. A capacitor 124 is tied between the input pin to which the thermistor 124 is connected and ground.

Thermistor 120 and resistor 122 form a voltage divider. The signal present at the junction of these two components varies as a function of the ambient temperature of the battery 30 as monitored as a result of the temperature dependent resistance of thermistor 120. Processor 260 monitors the ambient temperature of the battery and occasionally records data based on this temperature. These data are not relevant to the invention to which this application is directed.

An LED 128 is connected to processor 260 through a resistor 130. The 3.3 VDC signal from voltage regulator 110 is applied to the anode of LED 128. Processor 260 selectively turns LED 120 on and off to provide a visual indication regarding the operating state of the battery 30.

Processor 260 applies a 3.3 VDC signal to data contact 82 through a Schottky diode 132 and a resistor 134. A resistor 136 is tied between data contact 82 and ground. Also tied between data contact 82 and ground is a reverse biased zener diode 138. One end of a resistor 140 is also tied to data contact 82. The opposed end of resistor 140 is tied to the gate of p-channel MOSFET 142. The source of MOSFET 142 receives the 3.3 VDC signal. The drain of MOSFET 142 is connected through a resistor 144 to ground. The signal present at the drain of MOSFET 142 is tied a data input pin of processor 260.

The drain of an n-channel MOSFET 146 is also connected to data contact 82. The source of MOSFET 146 is tied to ground. The gate of MOSFET 146 is tied to a data signal output pin of processor 260.

When battery 30 is not connected to another device, a fraction of the 3.3 VDC signal from processor 260 is applied through resistors 134 and 140 to the gate of MOSFET 142. MOSFET 142 is thus turned off. Consequently, the signal applied to the input pin of processor 260 is a constant LOW signal.

When another device is connected to battery, the second device and the battery share a common ground through the battery anode contact 80. The second device writes to the battery processor 260 by selectively tying the connected data contacts of the battery and the device to ground. This pulls the signal present at the junction of resistors 134 and 136 to ground. The negation of the application of voltage to MOSFET 142 results in the turning on of the MOSFET. The 3.3 VDC at the MOSFET drain is thus applied to the input pin of the processor 260 as a HIGH signal. The device attached to the battery causes a LOW signal to be asserted to the battery processor 260 by disconnecting the data contact 82-to-ground connection and asserting its internal pull-up resistor. This results in the turning off of MOSFET 142 and the consequential application of a LOW signal back to processor 260.

Signals are output from the battery processor 260 through MOSFET 146. When data are written out of the processor 260, the processor selectively applies signals to the gate of p-channel MOSFET 146. A HIGH signal is output from data contact 82 by the negation of a voltage from the signal output pin of processor 260. When the processor 260 is in this state, MOSFET 146 is in an off state. Consequently the voltage present at the junction of resistors 134 and 136 appears as a HIGH signal on data contact 82 to the attached device. Processor 260 causes a LOW signal to appear on data contact 82 by applying a 3.3 VDC signal to the gate of MOSFET 146. This turns on the MOSFET 146. As a consequence of MOSFET 146 turning on, the signal present at the junction of resistors 134 and 136 is pulled to ground, the LOW state signal.

Zener diode 138 protects the battery in the event an excess voltage appears on the data contact 82. In one version of the invention, zener diode 138 is selected to allow reverse biased current flow when the potential applied to the cathode is approximately 17 Volts or higher.

Figure 5:
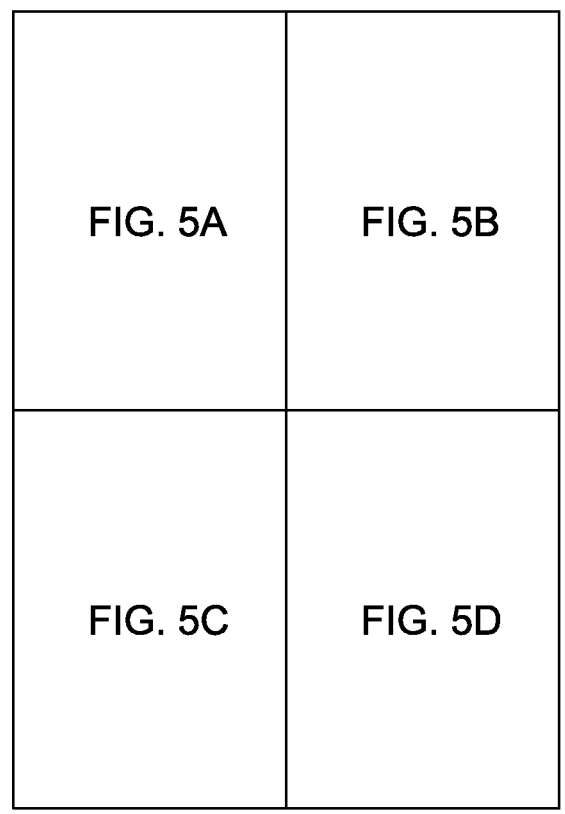
FIG. 5 is an assembly diagram depicting how
Figure 5A:
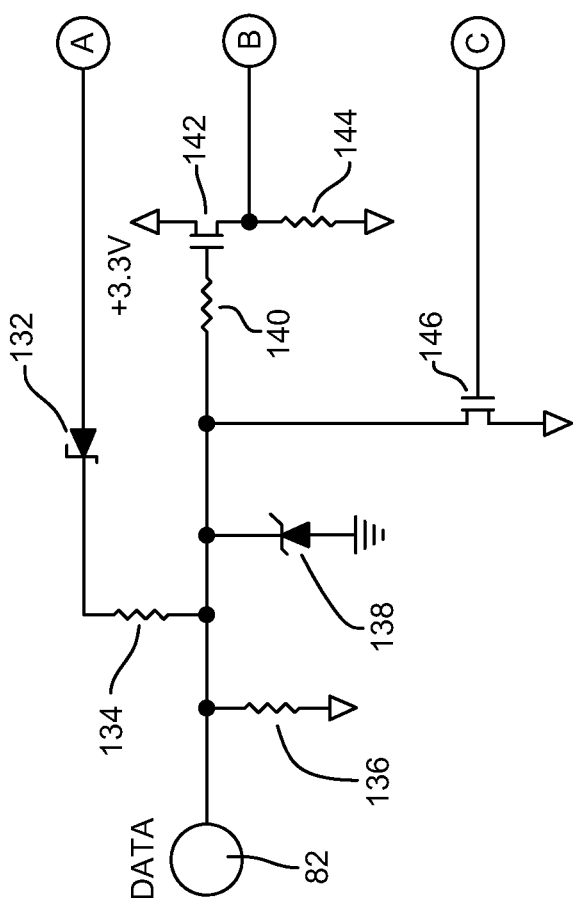
FIGS. 5A through 5D are assembled together to form a schematic and block diagram of the components of the battery.
Figure 5B:
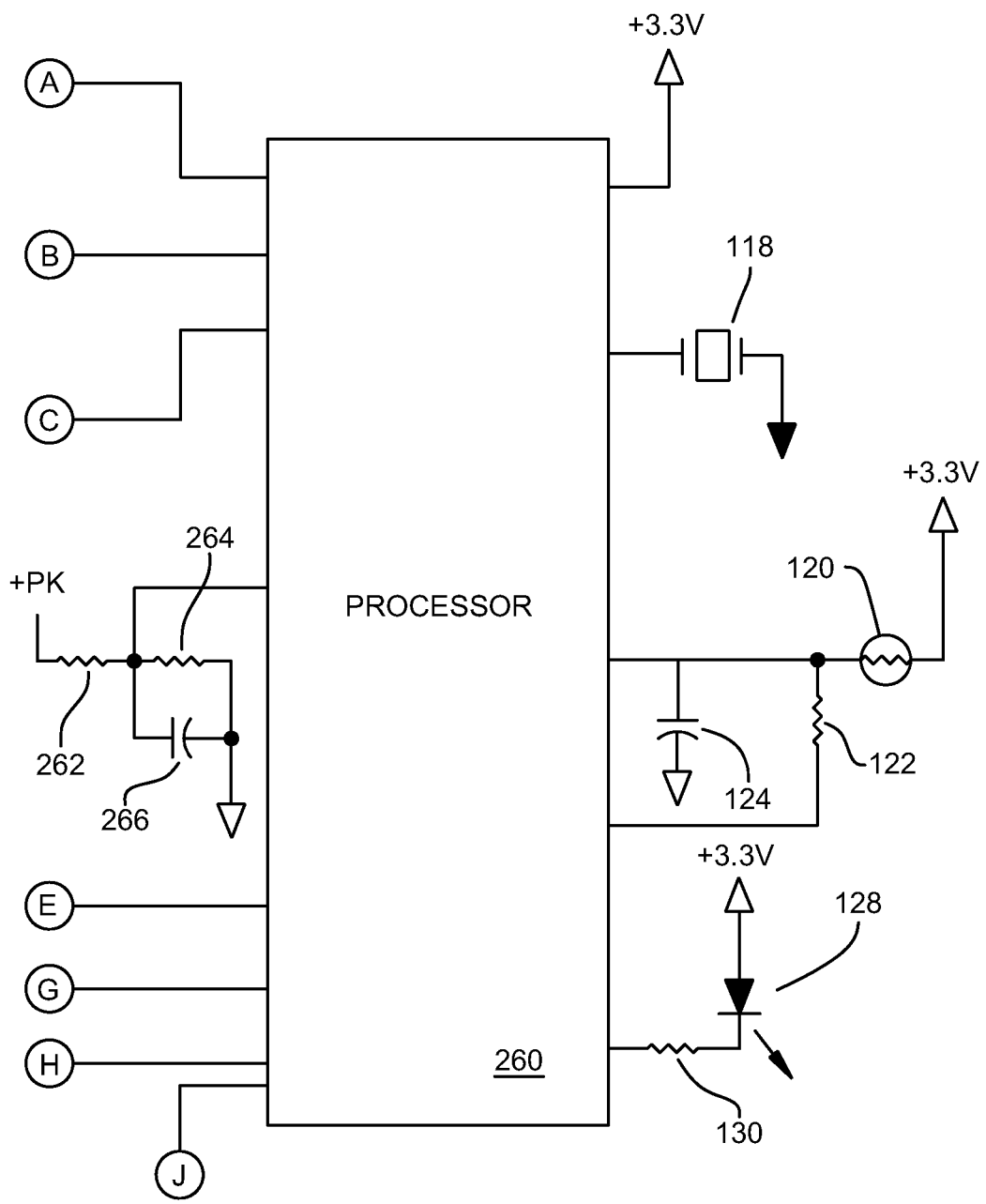
Figure 5C:
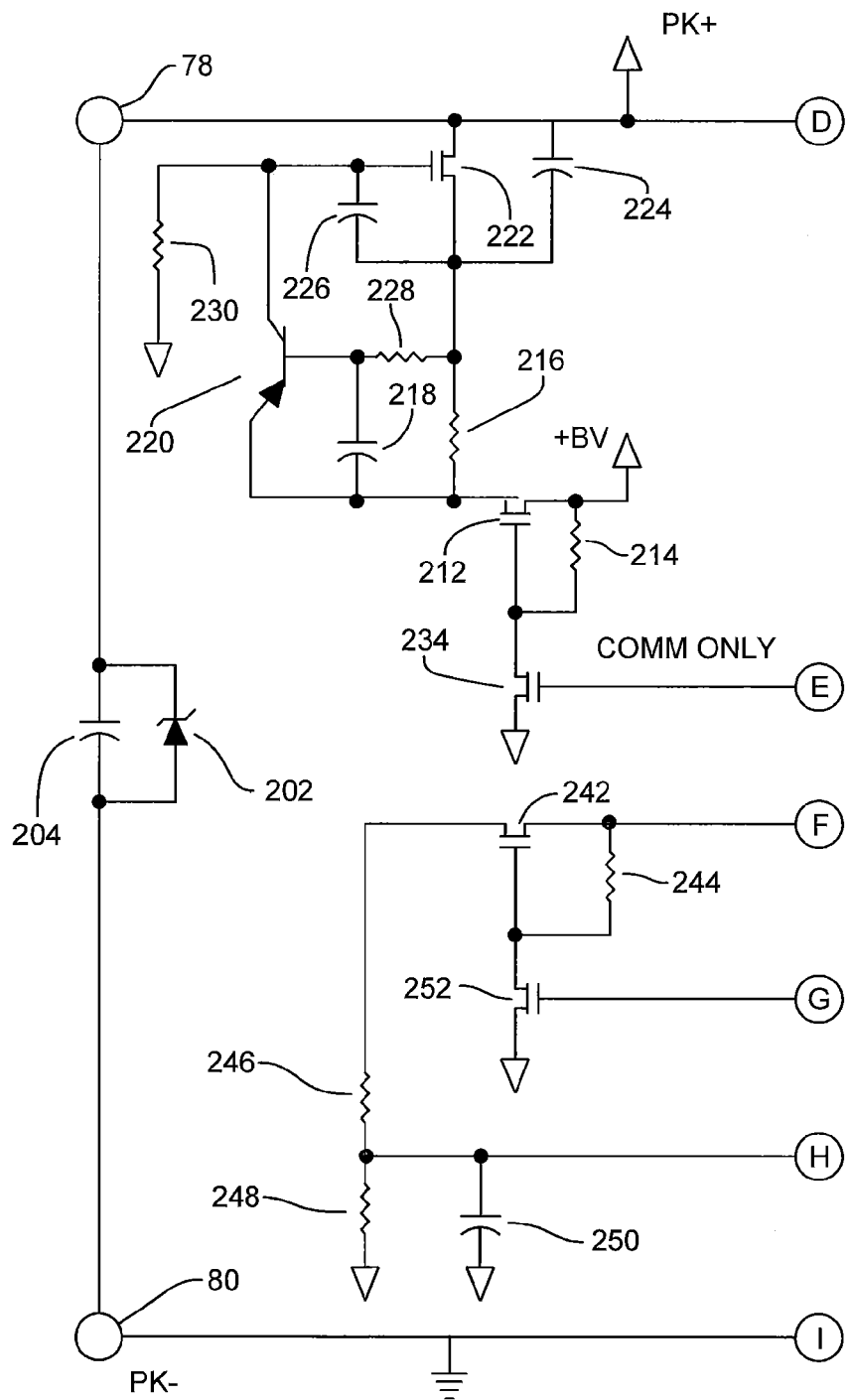
Figure 5D:
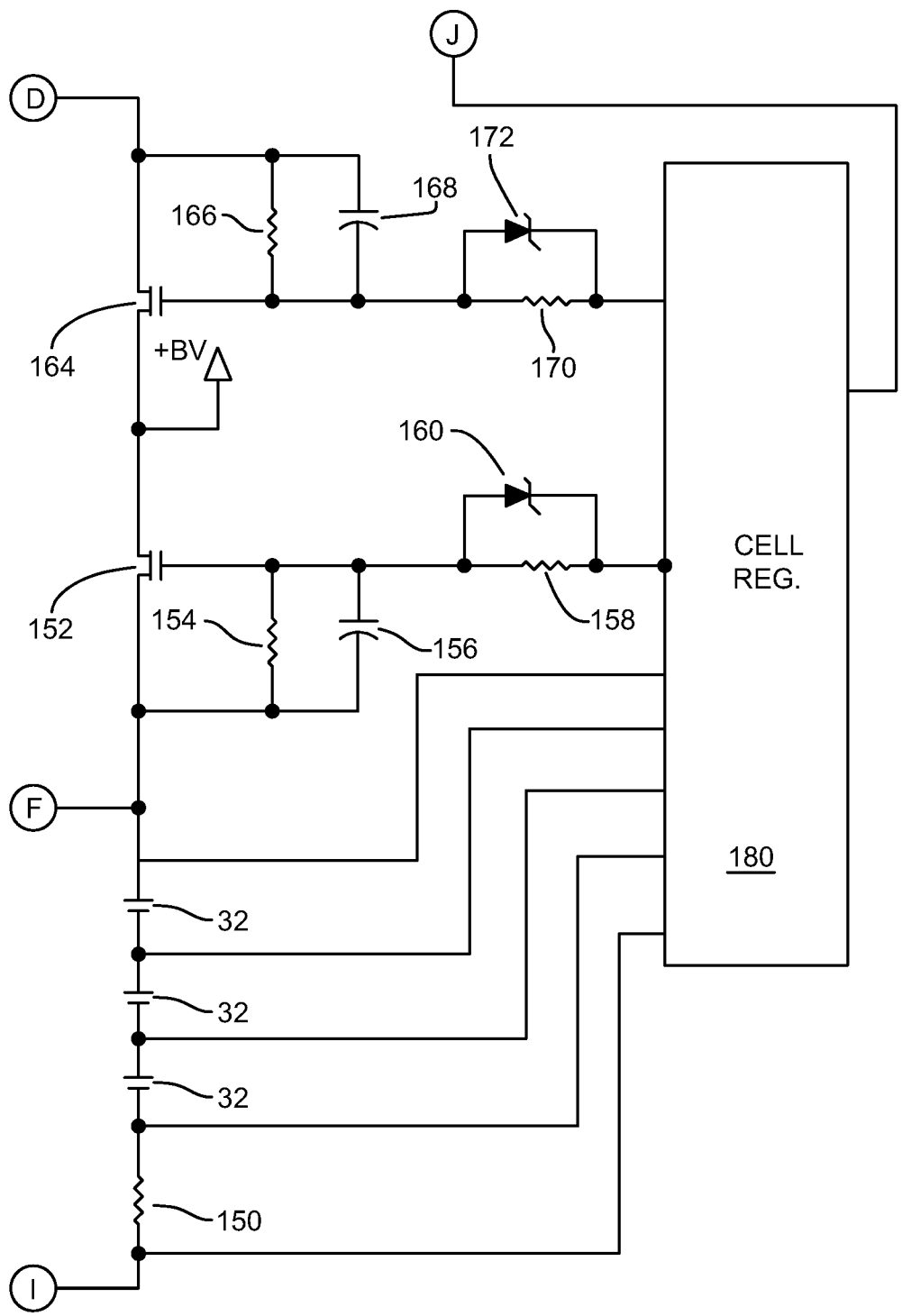

FIG. 5D depicts how the three cells 32 are connected in series. The anode of the cell 32 that functions as the anode of the cell cluster is tied to ground through a resistor 150. Also tied to ground is the battery anode contact 80. The cathode of the cell 32 that functions as the cathode of the cell cluster is connected to the battery cathode contact 78 through the n-channel switching n-channel MOSFETs 152 and 164. Specifically, the source of switching MOSFET 152 is connected to the cathode of the cell 32 forming the cathode of the cell cluster. The drain of MOSFET 152 is connected to the drain of MOSFET 164. The source of MOSFET 164 is connected to the battery cathode contact 78. MOSFET 152 is connected between the cells 32 and MOSFET 164 such that the body diode of MOSFET 152 is forward biased between the cells 32 and MOSFET 164. The signal present at the junction of MOSFETS 152 and 164 is the battery voltage (BV). This is the signal applied through resistor 102 and diode 106 to the voltage regulator 110. MOSFET 164 is connected between the cathode contact 78 and MOSFET 152 such that body diode of MOSFET 164 is forward biased from cathode contact 78 to MOSFET 152. The signal present at the source of MOSFET 164 is referred to as the pack (PK+) voltage.

The voltage present at the cathode of the cell cluster is applied to the gate of MOSFET 152 through a resistor 154. Also tied between the cathode of the cell cluster and the gate of MOSFET 152 is a capacitor 156. The signal that turns MOSFET 152 on and off is asserted by cell regulator 180 through a resistor 158. A Schottky diode 160 is forward biased between the gate of MOSFET 152 and the output pin of the cell regulator 180. Resistor 158 and diode 160 are thus parallel with each other.

A resistor 166 is connected between the battery cathode contact 78 and the gate of MOSFET 164. Also tied between these two points is a capacitor 168. The signal that turns MOSFET 164 on and off is asserted by cell regulator 180 through a resistor 170. A Schottky diode 172 is connected in parallel across resistor 170. Diode 172 is forward biased between the gate of MOSFET 164 and the output pin of cell regulator 180.

Turning to FIG. 5C it can be seen that a zener diode 202 is reverse biased connected between cathode contact 78 and anode contact 80. Zener diode is selected so as to allow reverse current flow when the potential across the contacts 78 and 80 is approximately 20 Volts or greater. A capacitor 204 is connected in parallel across diode 202. Capacitor 204 protects the components internal to battery from adverse affects of electrostatic discharge.

The current limited voltage source, also seen in FIG. 5C, receives as input voltage the BV signal present at the drain of MOSFET 152. This voltage is applied to the source of p-channel MOSFET 212. The BV signal is also applied to the gate of n-channel MOSFET 212 through resistor 214. The drain of MOSFET 212 is connected to a resistor 216, a capacitor 218 and the emitter of a pnp transistor 220. The drain of a p-channel MOSFET 222 is connected to contact 78, the contact to which pack voltage present at the source of MOSFET 164 is applied. The source of MOSFET 222 is connected between the end of resistor 216 opposite MOSFET 212. A capacitor 224 is connected across the source and drain of MOSFET 222. A capacitor 226 is connected between the gate of MOSFET 222 and the drain of MOSFET 222.

The end of capacitor 218 spaced from MOSFET 212 is connected to the base of transistor 220. A resistor 228 is also connected to the base of transistor 220. The opposed end of resistor 228 is connected to the junction of resistor 216, MOSFET 222 and capacitors 224 and 226. The collector of transistor 220 is connected to the gate of MOSFET 222. The collector of transistor 220 is also tied to ground through a resistor 230.

An n-channel MOSFET 234 selectively turns the current limited voltage source on and off. The drain of MOSFET 234 is connected between the gate of MOSFET 212; the source to ground. A communications only (COMM ONLY) signal is selectively asserted by processor 260 to the gate of MOSFET 234.

Also depicted in FIG. 5C is a circuit that provides a signal representative of the potential across cells 32. This circuit includes p-channel MOSFET 242 the source of which is connected to the cell cluster cathode. A resistor 244 connects the source of MOSFET 242 to the MOSFET gate. A resistor 246 extends from the drain of MOSFET 242. A resistor 248 extends from the free end of resistor 246 and ground. A capacitor 250 is parallel connected to resistor 248. The voltage present at the junction of resistors 246 and 248 is the signal that is applied to processor 260 as an indication of cell cluster voltage. This is the signal processor 260 monitors to determine whether or not the cell cluster has a voltage at least at or above a minimum voltage level. In some versions of the invention this minimum voltage level is 6 Volts.

The circuit for monitoring cell cluster voltage also includes a n-channel MOSFET 252. The drain of MOSFET 252 is tied to the gate of MOSFET 242. The source of MOSFET 252 is tied to ground. Processor 260 outputs a signal to the gate of MOSFET 252 to selectively activate/deactivate the cell voltage monitoring circuit.

Figure 6:
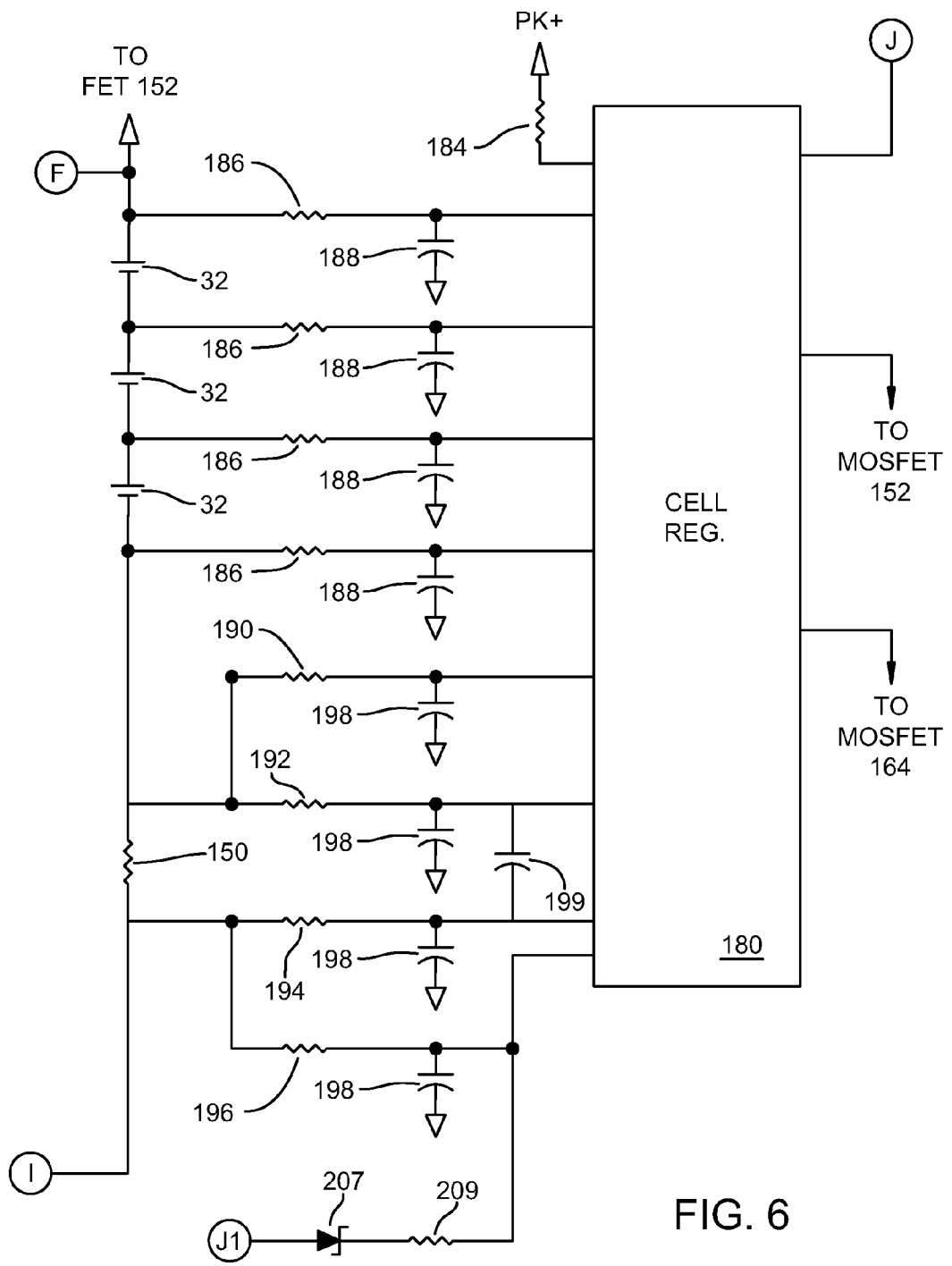
FIG. 6 is a schematic diagram depicting the components through which certain input signals are applied to the cell regulator.

In one version of this invention, cell regulator 180 is from the BQ20Z45 family of battery pack (gas gauge) regulators available from Texas Instruments, of Dallas, Tex. FIG. 6 provides a representation not seen in FIG. 5D of how a number of input signals are applied to cell regulator 180. Cell regulator 180 is normally powered by the attached cells 32, (power connection from cells not shown). The pack voltage is applied to the cell regulator through a resistor 184. The pack voltage is used by the below described n-channel high side drivers internal to the regulator 180. If cells 32 are not able to power the regulator 180, the pack voltage, which is positive when the battery is being charged, can power the cell regulator 180

The signal present at the cathode and anode of each cell 32 is applied through a resistor 186 to a cell voltage sense input pin of the cell regulator 180. It should be appreciated that at the junction of the cathode of one cell 32 and the anode of the adjacent series connected cell, a single resistor 186 functions as the component through which the signal present at this junction is applied to one of the cell regulator's voltage sense pins. A capacitor 188 is tied between each voltage sense input pin and ground.

The voltage across resistor 150 is also monitored by cell regulator 180. This voltage is monitored so the cell regulator 180 can determine the current flowing into or out of the cells. The signal present at the junction of resistor 150 and the anode of the cell cluster is applied through two resistors 190 and 192 to separate input pins of the cell regulator 180. The signal applied through resistor 190 is applied to a first short circuit and overload differential input of the cell regulator 180. The signal applied through resistor 192 is applied to a first coulomb counter differential input of the cell regulator. Resistor 190 has a resistance that is approximately one-third of the resistance of resistor 192. The signal present at the junction of resistor 150 and ground is applied through two additional resistors 194 and 196 to two additional input pins. The signal applied through resistor 194 is applied to a second differential coulomb counter differential input of the cell regulator 180. The signal applied through resistor 196 is applied to a second short circuit and overload differential pin of the cell regulator 180. Resistor 194 has a resistance equal to that of resistor 192. Resistor 196 has a resistance equal to that of resistor 190.

A capacitor 198 is connected between each of the voltage sense/overload detection and coulomb counter input pins and ground. Capacitors 198 have an identical capacitance. A capacitor 199 is tied between coulomb counter input pins. Capacitor 199 has a capacitance that is approximately one-tenth the capacitance of capacitors 198.

The resistances of resistors 190-196 and the capacitances of capacitors 198 and 199 are selected so that very large momentary low and high voltage spikes are filtered out of the signals applied to the circuits internal to the cell regulator 180 that monitor current draw. This is because certain surgical tools 50 that may be attached to battery 30 may momentarily causes these extreme voltage variations. This is especially true if the tool 50 includes a motor 54 that is run in an oscillatory mode. During the phase of the operation of the motor 54 when the rotor reverses the direction of the rotation, the motor may appear to be drawing a current in excess of what the battery 30 is intended to supply. Resistors 190-196 and capacitors 198 and 199 filter out the voltage spikes that are present across resistor 150 when these current fluctuations occur. This prevents the cell regulator 180 from incorrectly interpreting these voltage spikes as an indication that the battery and tool are in some sort of fault state in which it is necessary to stop sourcing current to the tool.

Internal to the cell regulator 180 are sub-circuits (not illustrated) that that selectively control the charging of the cells and the turning on and off of MOSFETS 152 and 164. These sub circuits include a charge balancing circuit. During the charging of the cell, the charge balancing circuit monitors the charging in the cells. If it is determined that the charges are not in balance, cell regulator 180 selectively connects an internal resistor (not illustrated) to at least one the cells so as to ensure that the charge is balanced.

Also internal to cell regulator is a charge pump, sometimes identified as an n-channel high side driver. When it is necessary to turn on either one of the MOSFETS 152 and 164, the charge pump outputs a high voltage signal, approximately 20 Volts. This is the signal that is applied to the gate of the MOSFET 152 or 164 to be turned on.

Also internal to cell regulator 180 are circuits that monitor the voltage across resistor 150. When the battery is being charged, these circuits monitor the voltage across resistor 150 to determine if the current flow into the cells 32 is above a maximum limit. When battery 30 is attached to a tool 50, these circuits monitor the voltage across the cells to determine if current flow out of the cells is at or below a maximum limit. If it is determined that the battery may be approaching or in a fault state, these circuits may cause the other sub-circuits internal to the cell regulator 180 to send data regarding the battery state to the processor 230.

The pack signal present at battery cathode contact 78 is applied to an input pin of processor 260 through a voltage divider consisting of series connected resistors 262 and 264. One end of resistor 262 is connected to the cathode contact 78. The end of resistor 264 opposite the end connected to resistor 262 is tied to ground. A capacitor 266 is tied in parallel across resistor 264.

Processor 260 monitors the pack voltage to determine whether or not the battery 30 is attached to the charger 40.

Cell regulator 180 and processor 260 exchange a number of signals. For ease of illustration, the connection between the cell regulator 180 and the processor 260 is depicted in FIGS. 5B and 5D as a single line. In actuality there are plural connections between these two components. One of these connections is an I²C data bus. One line is a data line. The second line is a clock line. These are lines over which processor 260 instructs the cell regulator 180 to turn and turn off MOSFETs 152 and 164. These are also the lines over which the cell regulator 180 writes out data regarding cell status to the processor 260. These data write outs from the cell regulator 180 occur in response to specific instructions from processor 260.

There is also a dedicated connection over which the processor 260 asserts a signal to the cell regulator 180 when the processor determines the pack voltage has dropped below the low voltage minimum. This dedicated connection is only shown in FIG. 6, the connection starting at connection point J1. This signal is applied to cell regulator through a Schottky diode 207 and a resistor 209 to the cell regulator. The signal is applied to one of the cell regulator input pins that receives one of the signals used to monitor whether or not the cells are in a short circuit or overload state. When processor 260 determines that the cells are in the low voltage state, the processor asserts the 3.3 VDC to the short circuit pin of cell regulator 180. To the cell regulator 180 the signal appears as short circuit signal. Accordingly, upon receipt of this low pack voltage signal, the cell regulator 180 quickly turns off MOSFETs 152 and 164. This prevents the continued application of low voltage power signals to the attached tool 50. This rapid termination of the low voltage power signals substantially eliminates the likelihood of over discharge of cells 32. This over discharge, if allowed to occur, could permanently damage the cells 32.

III. Operation

Battery 30 typically is awaiting either connection to the charger 40 or tool 60. At this time, the battery 30 is considered to be in an idle state. When in this idle state, the components internal to the battery draw a relatively low amount of current. This minimizes the discharging of the cells 32. As part of minimizing the current draw of the components internal to the battery 30, when the battery is in this mode, processor 260 does not output instructions to the cell regulator 180 that cause the cell regulator to turn on MOSFETs 152 and 164. Owing to the forward biased arrangement of the body diode of MOSFET 152, the battery voltage is still present at the junction of MOSFETs 152 and 164. This voltage is thus continually applied to voltage regulator 110. Voltage regulator 110 is, in turn, able to source the 3.3 VDC signal to the other components of the battery that, even when the battery is in the idle state, require this signal. However, since MOSFET 164 is turned off, the pack voltage should be at or near zero.

When the battery is in the idle state, processor 260 applies a signal to the gate of MOSFET 142, the MOSFET tied to data contact 82. The MOSFET 142 is thus in an off state. Consequently MOSFET 142 presents a constant LOW voltage signal to the data input pin of the processor 260. Also when battery 30 is in the idle state, processor 260 does not assert the COMM ONLY signal. MOSFET 234 is therefore in the off state. Consequently, the BV voltage is applied through resistor 214 to the gate of MOSFET 212. MOSFET 234 is therefore also in the off state. Therefore, there is no current flow through current limited voltage source. The current limited voltage source is therefore in an inactive state.

When the battery 30 is in the idle state, processor 260 also does not assert the signal to the gate of MOSFET 252 required to turn on the MOSFET 252. The potential present at the cathode of the cell cluster is therefore applied through resistor 244 to the gate of MOSFET 242. This signal holds MOSFET 242 in the off state. When MOSFET 242 is in this state, there is no cell draining current flow through resistors 246 and 248.

Figure 7:
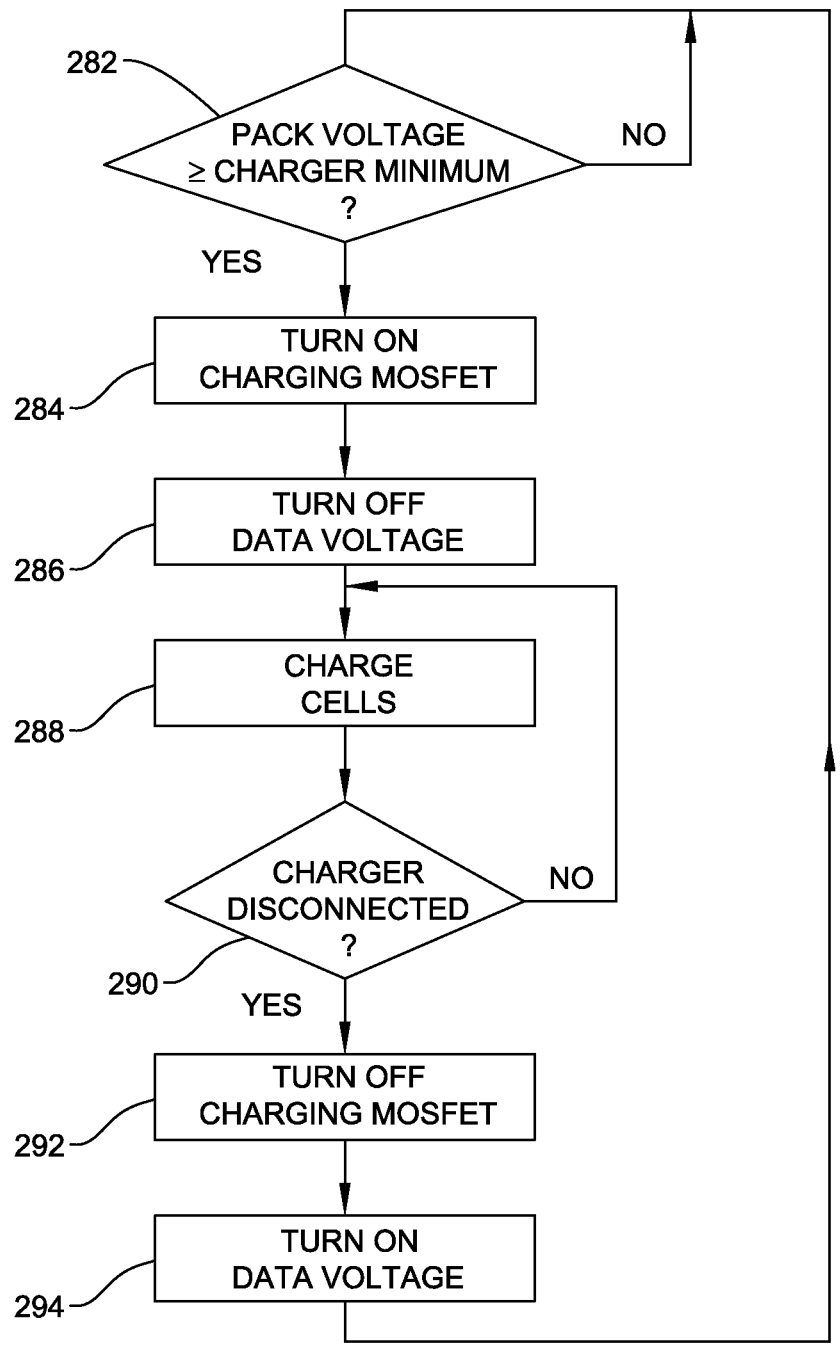
FIG. 7 is a flow chart of the process steps executed by the battery when attached to a charger.

The process steps executed by the battery 30 during charging are now described by reference to the flow chart of FIG. 7. When in the idle mode, processor 260 monitors the voltage present at the junction of resistors 262 and 264, step 282. Unless the battery is connected to another device, the pack voltage is nil. The voltage present at the junction of resistors 262 and 264 should essentially be at ground level.

While in this idle state, the battery processor 260 may perform environmental monitoring that is not material to the present invention. This monitoring can include the periodic recording of battery temperature based on the signal present at the junction of thermistor 120 and resistor 122.

The power supply 44 of charger 40 continually sources a low current signal to the contacts integral with the contacts integral with the charger sockets 42 (socket contacts not illustrated). When the battery 30 is fitted to the socket, connections are established between the battery contacts 78, 80 and 82 and the complementary charger socket contacts. As a consequence of the establishment of these connections, the pack voltage rises from above ground level to the level of the potential of the signal sourced by the charger. In step 282, the processor 260 interprets this rise in pack voltage above a minimum level as an indication that battery 30 is fitted to a charger and can be charged. The battery can be considered to be transition from the idle state to a charging state.

While not illustrated, it should be appreciated that, in some versions of this invention, at this time processor 260 exchanges signals with the charger processor 46 through data contact 82. For example, the charger processor 46 may write out from the memory integral with battery processor 260 data useful for determining how charging currents are to be applied to the battery. While not material to the current invention, it should be appreciated that these data are then used by charger processor 46 to regulating the sourcing of the charging current by power source 44. Also, the charger processor 46 may write data to the memory integral with the battery processor. These data may be data describing the specific charging process to which the battery is now being subject.

Once any initial data read/write processes are performed, processor 260 configures the battery for actual charging. This process begins with the processor 260 turning on MOSFET 152, step 284. In some versions of the invention MOSFET 164 is also turned on. It may not be necessary to turn on MOSFET 164 since, during charging, there will be current flow through the body diode of MOSFET 164. It should be understood that processor 260 is not the actual component that turns on either of MOSFETs 152 or 164. When it is necessary to turn on/turn off one of MOSFETs 152 or 164, processor 260 sends an instruction to the cell regulator 180. In response to this instruction, the cell regulator 180 causes the n-channel driver internal to the regulator to assert or negate the signal applied to the particular MOSFET 152 or 164. To reduce redundancy, it will be understood that this is how each of the described tuning on or off of MOSFETs 152 or 164 by processor 260 is performed.

After MOSFET 152 is turned on, battery processor 260 negates the application of the 3.3 VDC signal through diode 132 to data contact, step 286. This is because, in the described implementation of the system, once charger 40 starts sourcing current to the battery 30, the charger processor 46 asserts a constant voltage to data contact 82. This signal holds MOSFET 142 in the off state. Consequently at this time, the MOSFET 142 presents a constant LOW signal to processor 260. As discussed below, receipt of this LOW signal is interpreted by the processor 260 as an indication that the battery 30 attached to the charger 40.

The turning on of MOSFET 152 allows the current sourced by the charger 40 to flow to the cells 32. The cells are now being charged, step 288. The actual process by which charger 40 sources current to battery 30 is not part of the present invention. In FIG. 7 this is the charge cells step 288. Often a charger is designed so that after an attached battery is fully charged, the charger sources a small trickle current to the battery. This trickle current prevents the charge stored in the cells 32 from falling appreciably below the fully charged level.

While not depicted as explicit steps, it should be understood that during the charging process, the cell regulator 180 and processor 260 continually monitor the state of the cells 32. Specifically, by monitoring the voltage across resistor 150, the cell regulator determines if there is excess current flow into the cells. In some versions of the invention, the cells are considered to be subjected to an excess current flow once the current exceeds 5 Amps. In the event the cell regulator 180 determines that there is excess current flow into the cells 32, the cell regulator turns off MOSFET 152 so as to at least temporarily terminate the charging process.

During charging, battery processor 260 periodically monitors the voltage across the cells 32. Processor 260 initiates this monitoring by applying a signal to the gate of MOSFET 252. The resultant turning on of MOSFET 252 causes the voltage present at the gate of MOSFET 242 to go to ground. MOSFET 242 is thus turned on. As a consequence of MOSFET 242 turning on, there is current flow from the cells 32 through resistors 246 and 248. The signal present at the junction of resistors 246 and 248 is applied to the processor 260 as a signal representative of cell cluster voltage.

In some versions of the invention, battery processor measures the cell cluster voltage once every 5 to 100 milliseconds. Each time the cell cluster voltage is measured, the voltage measuring circuit is actuated for a period of 0.5 to 10 milliseconds. Battery processor 260 only periodically performs this internal cell cluster voltage monitoring so as minimize the extent to which this monitoring drains the charge stored by the cells 32.

In the described version of the invention wherein the cell cluster should have a potential of 9.9 VDC, the maximum voltage that should appear across the cluster in the charging process is 12 Volts. In the event the measured cell cluster voltage exceeds this maximum level, processor 260 instructs the cell regulator 180 to turn off MOSFET 152. This substantially eliminates the likelihood that the cells 32 could suffer damage due to overcharging.

Once the battery 30 is attached to the charger 40, battery processor 260 continually evaluates whether or not the battery remains attached to the charger, step 290. As implied above with regard to the execution of step 286, processor performs this monitoring by monitoring the state of the signal present at the drain of MOSFET 142. As long as the battery 30 remains attached to the charger 40, a LOW signal remains present at the drain of MOSFET 142.

Once the battery 30 is removed from charger socket 42, the charger 40 no longer applies a signal to the gate of MOSFET 142, step 292. MOSFET 142 therefore, upon the removal of the battery from the charger, immediately turns on. The 3.3 VDC signal present at the drain of MOSFET 142 is applied through the MOSFET to the processor 360 as a HIGH signal. Processor 260 interprets the transition of this signal from the LOW state to the HIGH state as an indication that the battery was removed from the charger.

Upon removal of the battery 30 from the charger 40, processor 260 turns off MOSFET 152, step 292. If MOSFET 164 was turned on, the MOSFET is also turned off. The battery processor 260 returns to applying a 3.3 VDC signal to the gate of MOSFET 142, step 294. The execution of step 290 thus returns the battery to the idle state in which the processor 260 monitors whether or not the battery is attached to a charger 40, (the rexecution of step 282) or attached to a tool, (execution of step 312 below).

Figure 8A:
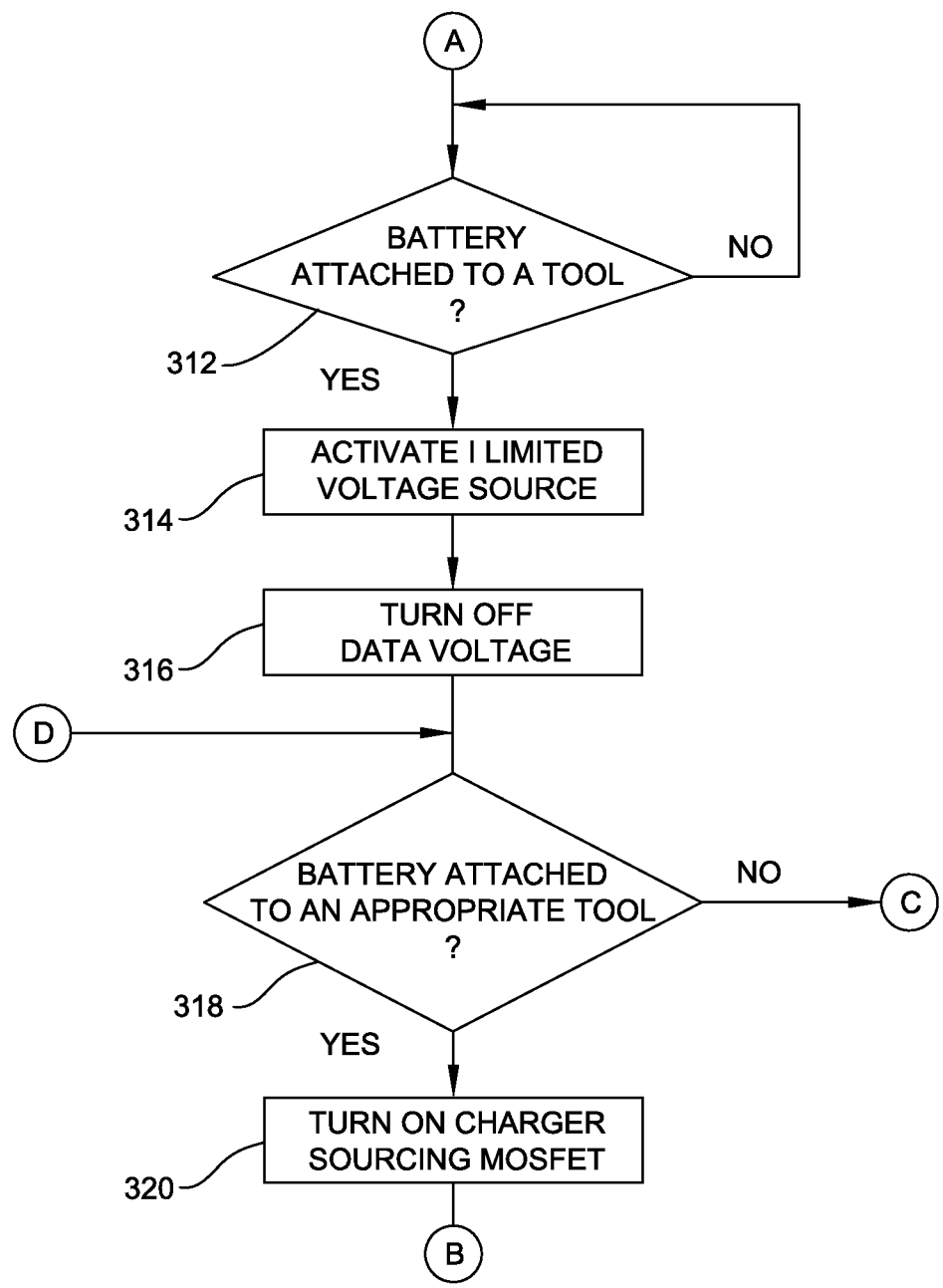
FIG. 8A through 8C are a set of flow charts that executed by the battery when the battery is employed to power, to source current to a power consuming device.
Figure 8B:
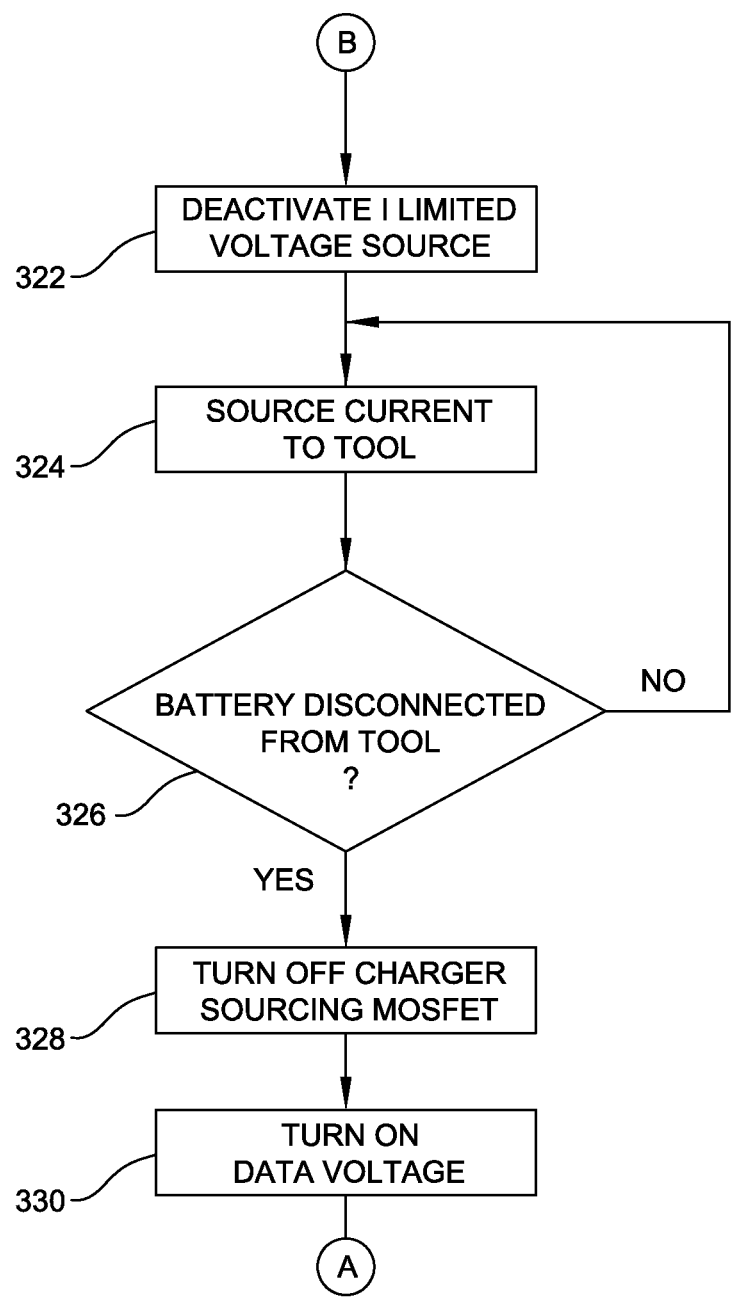
Figure 8C:
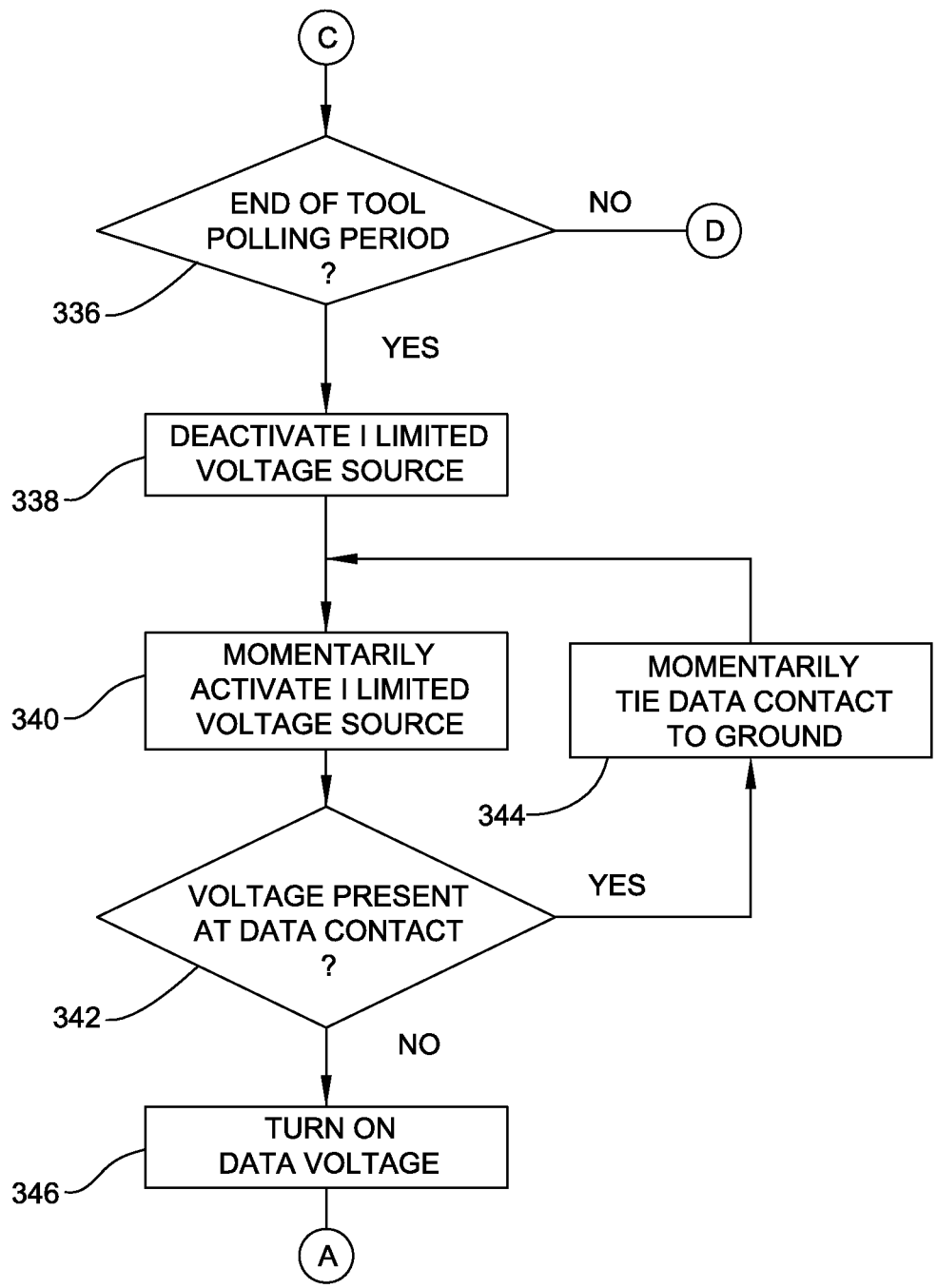

The steps executed by which the battery 30 sources current to a tool 50 are now described by reference to FIGS. 8A through 8C. Initially the battery 30 is in the previously described idle mode. MOSFETs 152 and 164 are turned off. The voltage present at MOSFET 142 causes a steady state LOW signal to be presented to the data read input pin of battery processor 260. The current limited voltage source is inactive. There is no current flow through the circuit from which the cell cluster voltage level is measured.

Step 312 represents the processes executed by processor 260 to determination whether or not the battery is connected to a tool 50. It should be understood that step 312 occurs sequentially with the execution of the previously described step 282. In step 312, battery processor 260 determines whether or not the battery is attached to a tool 50 by monitoring the state of the signal present at the source of MOSFET 142. The continued receipt of LOW signal from MOSFET 142 is interpreted as indication that the battery is not attached to a tool or other device.

When the battery is attached to a tool, the signal at data contact 82 is pulled to ground. This is because, when the tool 50 is deactivated, the complementary data contact integral with the tool is tied to the tool anode contact. When the battery 50 is attached to the tool, the battery anode contact 80 is connected to the tool anode contact. The pulling of the signal at data contact to ground turns on MOSFET 142. The 3.3 VDC signal applied to MOSFET 142 is thus applied to the data read input pin of battery processor 260 as a HIGH signal. The transition of the signal present at this pin from the LOW state to the HIGH state is interpreted by the processor 260 as being an indication that the battery may now be attached to a tool.

Upon determining that the battery 30 may be attached to a tool 50, processor 260 transitions the battery 30 from the idle state to a device interrogation state. As part of this transition, the current limited voltage source is activated, step 314. Processor 260 performs this function by asserting the COMM ONLY signal, which is asserted HIGH, to MOSFET 234. The assertion of the COMM ONLY signal turns MOSFET 234 on. The voltage present at the gate of MOSFET 212 thus pulled to ground, turning MOSFET 212 on.

When MOSFET 212 is on, the battery voltage flows through the MOSFET 212, resistor 216 and MOSFET 222 to cathode contact 78. The battery voltage is also applied to the emitter of transistor 220. The signal present at the junction of resistor 216 and MOSFET 222 is applied to the base of transistor 220 through resistor 228. The signal present at the collector of transistor 220 is applied to the gate of MOSFET 222. The application of the signal to the gate of MOSFET 222 causes the resistance through MOSFET to rise. MOSFET 222 thus acts as a linear resistance the resistance of which increases as the device attached to the battery increases its current draw.

The current limited voltage source, when activated, thus limits the current battery 30 sources through cathode contact 78. More particularly, the current limited voltage source is configured to limit the current applied to the tool to a level sufficient to actuate the tool processor 62 yet not sufficient enough to actuate the tool power generating device, (motor 54). In some versions of the invention, the current limited voltage source limits the current source over cathode contact to between 150 and 300 mA. As part of step 314, the processor 260 also starts to measure time in which the current limited voltage source is activated. Since the voltage output when the current limiter is actuated is sufficient to facilitate communication between a tool 50 and a battery 30 it is sometimes referred to as a communications voltage.

The application of the energization signal to the tool processor 62 causes the tool processor to turn on, (step not shown.)

As part of the transition of the battery 30 from the idle state to the device interrogation state, in a step 316, processor 260 negates the application of the 3.3 VDC signal to the gate of MOSFET 142. This allows tool processor 62 to exchange signals with battery processor 260.

Battery processor 260 then determines if the battery is in fact connected to a tool 50, step 318. As discussed below, the signal present at data contact 82 may have been pulled low for reasons other than attachment to a tool. Step 318 is performed by the tool processor 62 and battery processor 260 exchanging recognition codes. These codes are exchanged over data contact 82 and the complementary tool data contact. The protocol by which processor 62 and 260 exchange these recognition codes is not part of the present invention. Battery processor 260 interprets the receipt of an acceptable recognition code that the battery is attached to a tool 50 the battery is designed to power.

If processor 260 determines that the battery is attached to tool 50 or other device the battery is intended to charge, processor 260 transitions the battery 30 from the device interrogation state to a sourcing current state. Entry into the sourcing current state starts with the turning on of MOSFET 164, step 320. In some versions of the invention MOSFET 152 is also turned on. In a step 322 processor 260 negates the application of the COMM ONLY signal so as to inactivate the current limited voltage source.

As a consequence of MOSFET 164 being turned on, current flows through MOSFETs 152 and 164 and cathode contact 78 to the tool 50. There is no need to turn MOSFET 152 on since there is current flow through body diode of MOSFET 152. Since this current flow is not a limited current flow, the current is sufficient to energize the power generating unit, motor 54, integral with the tool, step 324.

While not illustrated, during the sourcing of current to the tool, it should be understood that the battery 30 monitors both the current draw out of the cell cluster and the voltage across the cell cluster. Cell regulator 180 monitors the current drawn from the cell cluster using the same means the current sourced to the cells is monitored, by monitoring the voltage across resistor 150. Some batteries of one version of this invention are designed so that if the current draw out of the cell cluster exceeds 32 Amps, the draw is considered above the designed limit. Other batteries are designed so that if the current draw exceeds 64 Amps, the draw is considered above the designed limit. Should cell regulator 180 determine that the current draw is above the design limit, the cell regulator turns off MOSFET 164. This substantially reduces the likelihood that either the battery or tool will be damages by an excessively high current draw.

When the battery sources current, processor 260 monitors the voltage cell cluster voltage using the same technique used to monitor this voltage during the battery charging. MOSFET 252 is periodically turned on so that the signal present at the junction of resistors 246 and 248 is applied to processor 260 as a measure of cell cluster voltage. Typically current is sourced to this voltage monitoring circuit at the same frequency at which it is sourced to this circuit and for the same duty cycle as when it is sourced during the charging state. When this voltage drops to a level below 6 VDC, processor 260 turns off MOSFET 164 to prevent the continued sourcing of a low voltage power signal to the tool.

While the battery 30 sources current to the tool 50, the battery processor 260 continues to negate the assertion of the 3.3 VDC signal to the gate of MOSFET 142. This allows the tool processor 62 to, during the time when the battery is attached to the tool, periodically write data to the battery processor 260. If there are extended periods in which the tool processor 62 does not write to the battery processor 260, the tool processor outputs a steady state signal through data contact 82 to MOSFET 142. This results in MOSFET 142 presenting the steady state LOW signal to the read pin of battery processor 260.

Battery processor 260 monitors the signal present at the drain of MOSFET 142 to determine if the battery remains attached to the tool, step 326. Upon removal of the battery from tool 50, the application of a signal from the tool processor over data contact 82 to MOSFET 142 terminates. The signal present at the drain of MOSFET 142 therefore transitions from the LOW state to the HIGH state. In step 326, processor 260 interprets this signal transition as indication that the battery is disconnected from the tool. The evaluation of step 324 is repeatedly performed as long as the battery is connected to the tool.

If, in step 326 it is determined that the battery is disconnected from the tool 50, battery processor 260 transitions the battery from the sourcing current state back to the idle state. As part of this process, MOSFET 164 is turned off, step 328. Step 328, thus negates the presence of the presence of a potential from being present at cathode contact 78. In a step 330, processor 260 again outputs the 3.3 VDC signal to the gate of MOSFET 142. Battery processor 260 then returns to the idle state task of step 282 of determining if the battery 30 is attached to the charger 40 and the idle state step 312 task of determining in the battery is attached to a tool 50.

Returning to step 318, in this evaluation, the battery processor 260 may not receive the recognition codes indicating that the battery 30 is attached to a tool 50 designed to be powered by the battery. This may occur because the attached tool is one that is not designed for use with the battery. Alternatively this event may occur because the battery head 76 is somehow submerged or otherwise exposed to a liquid that has established a conductive bridge between the data contact 82 and the anode contact 80. This bridge would pull the voltage present at the gate of MOSFET 142 to ground. There may be another reason not related to the proper operation or maintenance of the battery 30 that a conductive bridge may be present across these contacts.

Regardless of the reason for the presence of the conductive bridge, the result is that MOSFET 142 would assert a HIGH signal to the read input pin of battery processor 260 when the battery is not actually attached to a tool.

If in step 318 the processor 260 does not receive the recognition codes indicating that the battery is attached to an appropriate tool, the processor then determines if the current limited voltage source has been enabled for a defined initial polling period, step 336. In some versions of the invention, this polling period is between 1 and 4 seconds. If the current limited voltage source has not been activated for this time period, battery processor 260 again attempts to exchange recognition codes with the tool 50 that may be attached to the battery 30. These repetitive attempts to exchange recognition codes with any attached tool are performed because the tool processor 62 may require at least 1 second, if not more time, to boot up after initially being energized by battery 30. Not illustrated in the flow charts are the steps the battery processor 260 may execute to output interrogation signals over the data contact 82 in order to obtain a recognition code from the tool processor 62. Accordingly, if in step 336 the processor 260 determines that the current limited voltage source has been activated for less than the initial polling period, step 318 is repeatedly reexcuted in the expectation that the processor 62 integral with a tool to which the battery is attached write out an appropriate recognition code.

In an execution of step 336 processor 260 may determine that the current limited voltage source has be enabled for a time greater than the maximum polling period. If the result of this evaluation is positive, in a step 338, processor 338 disables the current limited voltage source. It is believed the most likely reason the evaluation of step 336 could be positive is because the battery head 76 is covered in a conductive fluid that is forming a conductive bridge between the data contact 82 and the anode contact 80. Accordingly, when the determination of step 336 is positive, the battery transitions from the tool interrogation state to a "submerged" state.

When in the submerged state, battery processor 260 then periodically monitors the signal present at the data contact 82 to determine if the battery is no longer in this state. This evaluation is performed by periodically momentarily reactivating the current limited voltage source, step 340. In some versions of the invention, the current limited voltage source is turned on once every 0.5 to 2.0 seconds. Each time the current limited voltage source is turned on it is turned on for a period of 5 to 20 milliseconds.

During the last quarter or third of the cycle in which the current limited voltage source is activated, battery processor 260 monitors the voltage present at the data contact 82, step 342. If the battery is still in the submerged state, the liquid will form a conductive bridge between the cathode contact 78, where the current is sourced, and the data contact 82, which is tied to ground through resistor 136. The signal present at the junction of the data contact 82 and resistor 136 is applied to the gate of MOSFET 142. Thus, the MOSFET 142 will be in the off state. The drain of MOSFET 142 will therefore present a LOW signal to the data read input pin of processor 260. Battery processor 260 interprets this LOW signal as an indication that the battery remains in the submerged state.

Upon making the determination that the battery remains in the submerged state, processor 260 momentarily ties the data contact to ground, step 344. This step is performed by momentarily turning on MOSFET 146. Step 344 is performed to ensure that, immediately after the test of steps 338 and 340 is executed, that the pack voltage is driven to ground. This substantially eliminates the likelihood that any residual float of the pack voltage would appear to the processor 260 as a false indication that the battery is now tied to the charger 40. If the processor 260 were to interpret this floating pack voltage as an indication that the battery is attached to the charger, the processor could inadvertently transfer the battery from the submerged state to the charging state. If this transfer occurs, the contacts could be subjected to some electrolysis. It should be understood that MOSFET 146 is turned off before the below described reexecution of step 342 is performed.

Processor 260 continues to reexcute steps 340, 342 and 344 as long as the battery remains in the submerged state.

Eventually the conductive bridge, be it solid or liquid, is removed from between the battery contacts. The removal of the liquid bridge is performed by the drying of the battery. The removal of the solid conductive bridge is performed by taking way whatever solid conductive component extends between the contacts. If, during the evaluation of step 342, the current bridge is no longer extends between the contacts, a voltage will not be present at the data contact 82. In this event, during the evaluation of step 342, MOSFET 142 will be turned on. The drain of MOSFET 142 will present a HIGH signal to the read input pin of processor 260. The processor 260 interprets the receipt of this HIGH signal as an indication that the battery 30 is no longer in the submerged state.

Upon making the above determination, processor 260 transfers the battery from the submerged state at least momentarily to back to the idle state. To perform this transition, processor 260 reapplies the 3.3 VDC to the data contact 82, step 346. The processor 260 again executes step 312 to determine whether or not the battery is attached to the tool. After the execution of step 346, during the initial reexecution of step 312, processor may continue to detect the presence of a HIGH signal at the read input pin. The presence of the HIGH signal during this step 312 evaluation means that the battery may be attached to a tool. Previously described steps 314, 316 and 318 are again executed.

Alternatively, after step 346 is executed, during the initial reexcution of step 312, the battery processor 260 detects the presence of a LOW signal on the read input pin. This occurs if the battery is no longer submerged and not attached to a tool. The battery is simply in the idle state. The LOW signal is present because they data contact is not tied to ground either through a tool or an extraneous bridge. Consequently, the 3.3 signal VDC from the processor 260 is applied to the MOSFET 142 and holds the MOSFET off. This results in the signal present at the drain of MOSFET 142 transitioning from the HIGH state to the LOW state. As described above, during the execution of step 312, processor 260 interprets the LOW signal received during this step as an indication that the battery is not attached to a tool 50. The battery has thus entered the idle state for a time period greater than that required to perform one execution of step 312. Processor 260 therefore continues to reexcute the step 282 idle state task of determining if the battery 30 is attached to the charger 40 and the step 312 idle state task of determining in the battery is attached to a tool 50.

Battery 30 of this invention is thus designed so that, prior to sourcing all of the charge stored in the battery cells 32, only a small, current limited, fraction of the charge is sourced. The battery therefore, upon attachment to a tool or other power consuming device, only initially sources the charge sufficient to power a control processor internal to the attached device. The power sourced is not sufficient to actuate the primary power consuming component internal to the device. Only if the processor 260 internal to the battery receives the appropriate recognition codes does the battery source the larger current charge needed to power the tool's primary power consuming component. Thus the battery of this invention does allow the primary power consuming component internal to the attached device to run, even for a one or two seconds, unless the attached device is intended for use of the battery. Eliminating the possibility of a short run of the attached device results in a like elimination that the short run could provide a person using the device with the incorrect impression that either the battery or the device is somehow malfunctioning.

Further, in the event that a conductive bridge other than the conductive bridge established by an appropriate attached tool appears between the terminals of the battery, battery 30 only occasionally presents a potential across the terminals of the battery. This potential, when it is presented, is current limited. This feature of battery 30 limits the likelihood that, if such a bridge is established, the bridge will drain the cells 32 to a level at which they are substantially discharged.

In the event that the bridge is established because the battery head 76 is submersed in a conductive liquid, since the potential is presented only periodically and is of a low current, the extent to which the anode contact 80 engages in an electrolytic reaction with the liquid is minimal. The minimizing of the extent to which the anode contact undergoes this reaction results in a like reduction in the extent this reaction causes a high impedance oxide layer to form on the contact 80.

IV. Alternative Embodiments

It should be appreciated that the foregoing is directed to one specific version of the invention. Other versions of the invention may have features different from what has been described.

For example, while battery 30 is described for use with a surgical tool 50, alternative batteries of this invention may be designed for use with other cordless devices that require electrical charge to function.

Likewise, there is no requirement that all batteries of this invention have each of the above-described features. Thus, some versions of this invention may not include the current limited voltage source. These versions of the battery of this invention may be provided for use with devices wherein internal to the device there is a circuit that prevents actuation of the primary charge consuming component if the correct battery is not attached to the device.

Alternatively, this version of the battery may be provided in versions of the battery used to power devices where the primary charge consuming device internal to the device to be powered does not draw much more power than the processor internal to that device. These devices include devices wherein the device processor is the primary device that draws current and wherein the device that draws current actually draws less current than the device's processor. In these versions of the invention, it may only be necessary to provide the battery with a circuit that determines if the conductive bridge across the contacts is established by some component other than an authorized device. In these versions of the invention, since the current limited power supply is not needed, it may be eliminated. In these versions of the invention the voltage that causes the current to flow sufficient for powering the device attached to the battery also functions as the communications voltage.

Similarly other versions of the battery of this invention may have different sub-assemblies that allow use of the battery after the processor makes the initial determination that the attached device is not intended for use with the battery. For example, after it is determined the attached device is not intended for use with the battery, the battery processor may not allow even the current limited voltage source to be connected to the cells for a period of 10 to 60 minutes. This would be useful for versions of the battery designed for an environment where there is increased likelihood that the battery may be the victim mischief or theft. These versions of the invention thus may not have the circuit that allows the battery to operate either in the described submerged state. In these versions of the invention, once it is determined the battery is not attached to a device the battery is designed to charge, the battery simply enters a lockout state. When in this lockout state, the battery does not even output the signals to the data contact 82 that allow the processor 260 to evaluate whether or not the battery may be attached to a tool and therefore should enter the tool interrogation state.

The number of and type of cells internal to the battery may of course be different from what is described. In that vein, it is understood that in some versions of the invention at least some of the battery cells may be connected together in parallel.

Likewise the components, voltage levels, current levels and time period described above, unless recited in the claims, are understood to be exemplary, not limiting. Also, alternative versions of the invention may have circuits different from what has been described. Thus, in some versions of the invention, plural components may perform the functions of each of the described cell regulator 180 and processor 260. Likewise, in other versions of the invention a single component may perform some or all of the functions of both the cell regulator and processor 260. The current limited voltage source may likewise consist of few, more and different components than what has been described.

In some versions of the invention the current limited voltage that is the communications voltage is also the voltage that supplies the current used to power the device powered by the battery 30.

The components internal to the battery may perform evaluations different what has been described. For example once it is initially determined in step 336 that the battery is in a submerged state, there are inappropriate current bridges in place across contacts 78, 80 and/or 82, other processes may be performed to determine if the battery has left the submerged state. For example, instead of activating the current limited voltage source, a signal could be output by the processor 260 and diode 132 on the data contact 82. Processor 260 could then monitor the signal present at the junction of resistors 262 and 264. If there is no bridge between contacts 78 and 82, this voltage should be zero. However, the presence of a voltage at the junction of resistors 262 and 264 would indicate that an inappropriate conductive bridge remains in place between contacts 78 and 82.

Likewise, in some batteries of this invention a single contact may function as both the cathode and data contact. In these versions of the invention, the processor would output the low voltage data signal to this contact. The processor by the selective monitoring of one of the contacts (cathode or anode) to determine the presence/absence of this signal would determine whether or not there may be an inappropriate conductive bridge between these contacts. In order to perform this monitoring, sensing units other then FETs may be used to monitor the presence of signal potential or current flow. For example, bipolar transistors or networks formed from one or more resistors, capacitors or inductors could perform this monitoring.

Alternatively, in versions of the invention wherein a single terminal functions as both the cathode and data contact, the battery may be provided with a third contact in addition to the cathode and the anode. This contact may be a sense contact. Components attached to this sense contact provide an indication of whether or not a voltage is present at this contact. The processor monitors the signals representative of the presence/absence of voltage at the sense contact to determine whether or not the battery has entered a submerged state. In this version of the invention a single switch, for example a FET similar to FET 164, may normally be closed so that there is a voltage present across the cathode and anode contacts of the battery. The presence of the voltage at the sense contact would be interpreted as an indication that the battery is in the submerged state. If the processor makes this determination, the processor would open the switch so as to reduce the overall time in which the electrolytic reaction is allowed to occur. Then, periodically the processor would momentarily close the switch. Once the switch is closed the processor would again monitor the signal at the sense contact to evaluate whether or not battery was still in the submerged state (an undesirable conductive bridge present between the contacts). If the evaluation indicated that battery is still in the submerged state, the switch is again opened and subsequently again momentarily closed. If however, there is no voltage across the sense contact, the processor would interpret the battery as being in a condition in which it left the submerged state. The processor would therefore hold the switch open.

In some versions of the invention there may not be a data contact. In these versions of the invention, the control circuit monitors the signals present at the sense contact to determine the extent to which the cells 32 should be connected to the contacts 78 and 80.

Further, the battery of this invention may not include the components in either hardware or software that place the battery in the submerged mode. This type of battery of this invention may be provided if there is little concern that an inappropriate conductive bridge, either solid or liquid, could be established between the contact over which the signal required to facilitate data communication and the anode.

Likewise, depending on the construction of the battery, the circuit employed to provide a signal representative of voltage across the cell (or cells) may be different from what has been described or even omitted.

The physical structure of the battery may also be different from what is described and illustrated. For example one or more of the contacts 78, 80 and 82 may be mounted directly to the housing as opposed to a lid or cover. Likewise the circuit board that holds the electrical components internal to the battery, instead of being mounted to the cell cluster, may be mounted to the housing or lid. Similarly, switches other than FETs, such as bipolar transistors may be employed to regulate current flow from the cells.

The electrical components of this invention may also differ from what has been described, the control circuit that (1) determines whether or not the battery is attached to a charger, attached to a power tool or in the submerged state and/or (2) selectively activated the current limiting circuit may not include the described processor. Thus, the first signal the battery monitors to determine if the battery has entered the state in which it is either attached to a tool or in the submerged state may not always be the transition of the signal at a sensing component like MOSFET 142 from the LOW to the HIGH state. In some versions of the invention the change in potential of this sensed signal may be the signal that functions as the indication that the battery is either attached to a tool or in the submerged state. Likewise the second signal monitored by the control circuit to determine more specifically whether or not if the battery is attached to the tool or in the submerged state may not always be the receipt of a specific data (recognition) signal. In some versions of the invention, this second signal indicating the battery is attached to the tool may be a signal of a specific potential. In some versions of the invention it may not be necessary to apply the communications voltage to the battery to determine if the battery is in the submerged state or tied to a device the battery is intended to power.

Likewise, in some versions of the invention, the control circuit may monitor the signal present at a first one of the contacts, for example the cathode contact 78, to determine if the battery has transitioned from the idled state. Once the detection of the signal at this contact indicates this transition has occurred, the control circuit monitors a second contact the sense contact or data contact to determine if the particular signal at this contact indicates that the battery is either attached to tool or other device or in the submerged mode.

Also while many versions of the battery of this invention include a housing that is sterilizable, that need not always be the case. This feature is often not part of the design for a battery of this invention that is not designed for medical/surgical use. Likewise, the features of this battery may be incorporated into what is often referred to as aseptic battery. An aseptic battery includes a cell cluster and a circuit board to which the electrical components such as the cell regulator, the FETS, the resistors, capacitors and processor are monitored. This cell cluster is not sterilizable. Instead, the cell cluster can be removably fitted into a housing that is sterilizable. Once the cell cluster is fitted in the housing, the housing is sealed. The cells and other cluster-forming components are thus encapsulated in a sterilized enclosure. Contacts integral with both the cell cluster and the housing provide the contact path over which current is sourced from the battery. A further understanding of the structure of an aseptic battery assembly can be obtained from U.S. Pat. No. 7,705,559/PCT Pub. No. WO 2007/090025 A1, the contents of which are incorporated herein by reference.

Further in some versions of the invention the battery may be a use-once battery. This type of battery has one or more charge storing cells that are not rechargeable.

Accordingly, it is the objection of the appended claims to cover all such variations and modifications as come within the true spirit and scope of this invention.

What is claimed is:

1. A battery, said battery comprising:
   at least one cell that stores charge;
   at least one sourcing contact over which current can be drawn from said at least one cell;
   a sense contact;
   a control circuit, said control circuit: connected between said at least one cell and said at least one sourcing contact to selectively connect said cell to said sourcing contact; connected between said at least one cell and said sense contact to selectively connect said cell to said sense contact; connected to said sense contact to monitor the signal present at said sense contact; and connected to one of said contacts to receive therefrom a recognition signal wherein, said control circuit is configured to:
   apply a voltage to said sense contact from said at least one cell while simultaneously monitoring the signal present at said sense contact;
   if said signal present at said sense contact is a first defined signal: connect said at least one cell to said at least one sourcing contact; negate the application of the voltage to said sense contact; and monitor the contact through which the recognition signal is received for receipt of the recognition signal;
   if an appropriate recognition signal is received, continue to connect said at least one cell to said at least one sourcing contact;
   if an appropriate recognition signal is not received: disconnect said at least one cell from said at least one sourcing contact; cycle on and off a connection between said at least one cell and one of said contacts; and, and when the connection between said at least one cell and said contact is cycled on, monitoring the signal present at said sense contact to determine if the signal is a second defined signal; and
   when the second defined signal is sensed at said sense contact, terminating the on and off cycling connection of said at least one cell to the one said contact and return to the steps of applying a voltage to said sense contact while simultaneously monitoring said sense contact for the presence of the first defined signal.

2. The battery of claim 1, wherein:
   said at least one source contact includes a cathode contact, an anode contact and said sense contact; and said sense contact is separate from said cathode contact and said anode contact; and
   said control circuit is further configured to, when cycling on and off the connection between said at least one cell and one of said contacts, cyclically connects said cell to said cathode contact.

3. The battery of claim 2, wherein said sense contact further functions as the contact over which the recognition signal is received.

4. The battery of claim 1, wherein when said control circuit is configured to monitor said sense contact for presence of the first defined signal by determining in the signal present at said sense contact undergoes a voltage shift.

5. The battery of claim 1, wherein said control circuit is further configured to:
   after determining that the first defined signal is present at said sense contact performing the step of connecting said at least one cell to said at least one sourcing contact for a defined period of time; and
   if after the period of time, an appropriate recognition signal is not received, performing the step of disconnecting said at least one cell from said at least one sourcing contact.

6. The battery of claim 1, wherein when said control circuit monitors the monitored contact over which the recognition signal is received to determine if a recognition signal comprising an appropriate recognition code is received.

7. The battery of claim 1, wherein said control circuit includes:
   a first switch that is selectively set to perform said steps of applying a voltage to said sense contact and negating the voltage applied to said sense contact; and
   a second switch that is selective set to perform said step of cycling on and off the connection between said at least one cell and the one said contact.

8. The battery of claim 1, further including:
   a current limiter; and
   wherein, during the step of connecting said at least one cell to said at least one sourcing contact while monitoring for receipt of a recognition signal and during the step of cycling the on and off the connection between said at least one cell and one of said contacts, said control circuit connects said at least one cell to the contact to which said cell is connected through said current limiter.

9. The battery of claim 8, wherein said control circuit, in response to the receipt of an appropriate recognition signal, connects said at least one cell to said at least one sourcing contact without connecting said cell to said sourcing contact through said current limiter.

10. The battery of claim 1, wherein said at least one cell and said control circuit are contained in a sterilizable housing.

11. The battery of claim 1, wherein said control circuit monitors at a single one of said contacts to determine if the first defined signal and then the recognition signal are received.

12. The battery of claim 1, wherein said at least one cell is a lithium ion cell.

13. The battery of claim 1, wherein:
   said at least one cell is rechargeable;
   said control circuit includes a switch that regulates current flow from one of said sourcing contacts to said at least one cell; and
   said control circuit is further configured to monitor one of said contacts for the presence of a signal indicating the battery is attached to a charger and, upon detection of the signal indicating the battery is attached to a charger, set said switch so that current can be sourced from a charger through the one said sourcing contact into the at least one cell.

14. A battery, said battery including:
at least one cell that stores charge;
at least one sourcing contact over which current can be drawn from said at least one cell;
a sense contact;
a selectively actuatable current limiter that limits the draw of current from said at least one cell through said at least one sourcing contact
a control circuit, said control circuit: connected between said at least one cell and said at least one sourcing contact to selectively connect said cell to said sourcing contact; connected between said at least one cell and said sense contact to selectively connect said cell to said sense contact; connected to said sense contact to monitor the signal present at said sense contact; connected to one of said contacts to receive therefrom a recognition signal; and connected to said current limit to selectively actuate said current limiter wherein, said control circuit is configured to:
 apply a voltage to said sense contact while simultaneously monitoring the signal present at said sense contact;
 if said signal present at said sense contact is a first defined signal: connect said at least one cell to said at least one sourcing contact; actuate said current limiter; negate the application of the voltage to said sense contact; and monitor the contact through which recognition signals are received for receipt of the recognition signal;
 if an appropriate recognition signal is received: continue to connect said at least one cell to said at least one sourcing contact and deactivate said current limiter;
 if an appropriate recognition signal is not received: disconnect said at least one cell from said at least one sourcing contact; cycling on and off a connection between said at least one cell and one of said contacts; and, and when the connection between said at least one cell and one of said contacts is cycled on, monitoring the signal present at said sense contact to determine if the signal is a second defined signal; and
 when the second defined signal is sensed at said sense contact, terminating the on and off cycling connection of said at least one cell to the one said contact and return to the steps of applying a voltage said sense contact while simultaneously monitoring said sense contact for the presence of the first defined signal.

15. The battery of claim 14, wherein:
said at least one source contact includes a cathode contact, an anode contact and said sense contact; and said sense contact is separate from said cathode contact and said anode contact; and
said control circuit is further configured to, when cycling on and off across the connection between said at least one cell and one of said contacts, cyclically connects said cell to said cathode contact.

16. The battery of claim 15, wherein said sense contact further functions as the contact over which the recognition signal is received.

17. The battery of claim 14, wherein when said control circuit is configured to monitor said sense contact for presence of the first defined signal by determining in the signal present at said sense contact undergoes a voltage shift.

18. The battery of claim 14, wherein said control circuit is further configured to:
after determining that the first defined signal is present at said sense contact performing the step of connecting said at least one cell to said at least one source contact for a defined period of time; and
if after the period of time, an appropriate recognition signal is not received, performing the step of disconnecting said at least one cell from said at least one sourcing contact.

19. The battery of claim 14, wherein said control circuit monitors at a single one of said contacts to determine if the first defined signal and then the recognition signal are received.

20. The battery of claim 14, wherein said at least one cell is a lithium ion cell.

21. The battery of claim 14, wherein said control circuit is further configured to, as part of the step of cycling on and off the connection between said at least one cell and one of said contacts, after cycling off the connection and prior to cycling on the connection, momentarily connect said sense contact to ground.

22. The battery of claim 14, wherein:
said current limiter is connected between said at least one cell and said at least one sourcing contact;
a switch is connected between said at least one cell and said sourcing contact;
said control circuit is further configured to:
 when actuating said current limiter, holding said switch open and connecting said at least one cell to said at least one sourcing contact through said current limiter; and
 when the appropriate recognition signal is received: deactivating said current limiter; and closing said switch.

23. A battery, said battery comprising:
at least one cell that stores charge;
at least one sourcing contact over which current can be drawn from said at least one cell;
a sense contact;
a control circuit, said control circuit: connected between said at least one cell and said at least one sourcing contact to selectively connect said cell to said sourcing contact; connected between said at least one cell and said sense contact to selectively connect said cell to said sense contact; connected to said sense contact to monitor the signal present at said sense contact; and connected to one of said contacts to receive therefrom a recognition signal wherein, said control circuit is configured to:
 apply a voltage to said sense contact while simultaneously monitoring the signal present at said sense contact;
 if the signal present at said sense contact is a first defined signal: connect said at least one cell to said at least one sourcing contact; negate the application of the voltage to said sense contact; and monitor the contact through which recognition signals are received for receipt of the recognition signal;
 if an appropriate recognition signal is received, continue to connect said at least one cell to said at least one sourcing contact;
 if an appropriate recognition signal is not received: disconnect said at least one cell from said at least one sourcing contact; cycle on and off a connection between said at least one cell and one of said contacts; when the connection between said at least one cell and said contact is cycled on, monitoring the signal present at said sense contact to determine if the signal is a second defined signal; and after cycling the connection off and prior to cycling the connection on, connecting said sense contact to ground; and when the second defined signal is sensed at said sense contact, terminating the on and off cycling connection of said at least one cell to the one said contact and return to the steps of applying a voltage said sense contact while simultaneously monitoring said sense contact for the presence of the first defined signal.

24. The battery of claim 23, wherein:

said at least one source contact includes a cathode contact, an anode contact and said sense contact; and said sense contact is separate from said cathode contact and said anode contact; and said control circuit is further configured to, when cycling on and off the connection between said at least one cell and one of said contacts, cyclically apply the voltage to said cathode contact.

25. The battery of claim 24, wherein said sense contact further functions as the contact over which the recognition signal is received.

26. The battery of claim 24, wherein said control circuit is further configured to:

after determining that the first defined signal is present at said sense contact performing the step of connecting said at least one cell to said at least one source contact for a defined period of time; and if after the period of time, an appropriate recognition signal is not received, performing the step of disconnecting said at least one cell from said at least one sourcing contact.

27. The battery of claim 24, wherein when said control monitors the monitored contact over which the recognition signal is received to determine if a recognition signal comprising an appropriate recognition code is received.

28. The battery of claim 24, wherein said at least one cell is a lithium ion cell.

29. The battery of claim 24, wherein said at least one cell and said control circuit are contained in a sterilizable housing.

30. The battery of claim 24, wherein said control circuit monitors at a single one of said contacts to determine if the first defined signal and then the recognition signal are received.

* * * * *